(12) United States Patent
Sadek

(10) Patent No.: US 9,635,559 B2
(45) Date of Patent: Apr. 25, 2017

(54) LOAD BALANCING IN NETWORK DEPLOYMENTS USING UNLICENSED SPECTRUM

(71) Applicant: QUALCOMM Incorporated, San Diego, CA (US)

(72) Inventor: Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 14/457,762

(22) Filed: Aug. 12, 2014

(65) Prior Publication Data
US 2015/0163681 A1    Jun. 11, 2015

Related U.S. Application Data

(60) Provisional application No. 61/914,650, filed on Dec. 11, 2013.

(51) Int. Cl.
*H04W 16/18* (2009.01)
*H04W 16/08* (2009.01)
(Continued)

(52) U.S. Cl.
CPC ............ *H04W 16/08* (2013.01); *H04W 16/14* (2013.01); *H04W 84/045* (2013.01)

(58) Field of Classification Search
CPC ... H04W 64/00; H04W 48/16; H04W 52/243; H04W 52/365; H04W 52/367;
(Continued)

(56) References Cited

U.S. PATENT DOCUMENTS 8,576,802 B2    11/2013  Won
2010/0085884 A1*  4/2010  Srinivasan ............ H04W 16/08
370/252

(Continued)

FOREIGN PATENT DOCUMENTS

| WO | WO-2010/039906 A1 | 4/2010 |
| WO | WO-2013/059999 A1 | 5/2013 |
| WO | WO-2013/079556 A1 | 6/2013 |

OTHER PUBLICATIONS

International Search Report dated Jun. 8, 2015 issued in International Application No. PCT/US2014/069021 (11 total pages).
(Continued)

*Primary Examiner* — Hirdepal Singh
(74) *Attorney, Agent, or Firm* — Arent Fox LLP

(57) ABSTRACT

Systems and methods for interference mitigation in unlicensed spectrum are disclosed. In an aspect, the methods and apparatus may include requesting, by a first network entity, one or more user equipments (UEs) to perform a plurality of frequency measurements, wherein the plurality of frequency measurements comprises measurements in a licensed spectrum and measurements in an unlicensed spectrum. Further, the methods and apparatus may include calculating a power back-off value based on the plurality of frequency measurements. Moreover, the methods and apparatus may include adjusting a cell coverage based on the power back-off value such that the one or more UEs are outside the cell coverage.

20 Claims, 17 Drawing Sheets

(51) Int. Cl.
*H04W 16/14* (2009.01)
*H04W 84/04* (2009.01)

(58) Field of Classification Search
CPC ..... H04W 72/08; H04W 16/08; H04W 16/14; H04W 16/18; H04W 24/02; H04W 28/18; H04W 52/06; H04W 52/146; H04W 52/1604
See application file for complete search history.

(56) References Cited

U.S. PATENT DOCUMENTS

| | | | |
|---|---|---|---|
| 2011/0081897 A1* | 4/2011 | Beattie, Jr. | H04W 40/36 455/418 |
| 2012/0069759 A1 | 3/2012 | Gummadi et al. | |
| 2012/0250631 A1* | 10/2012 | Hakola | H04L 5/001 370/329 |
| 2013/0114434 A1* | 5/2013 | Muruganathan | H04W 16/14 370/252 |
| 2013/0169484 A1* | 7/2013 | Raghupathy | G01S 19/46 342/386 |
| 2013/0184000 A1 | 7/2013 | Cook et al. | |
| 2013/0337821 A1 | 12/2013 | Clegg | |
| 2014/0219131 A1* | 8/2014 | Yang | H04W 56/00 370/252 |
| 2014/0354441 A1* | 12/2014 | Luna | H04W 4/008 340/686.6 |
| 2015/0195795 A1* | 7/2015 | Loehr | H04W 52/06 455/522 |

OTHER PUBLICATIONS

3GPP: "3rd Generation Partnership Project; Technical Specification Group Radio Access Network; Home Node B (HNB) Radio Frequency (RF) Requirements (FDD) (Release 11)", 3GPP Standard; 3GPP TR 25.967, 3rd Generation Partnership Project (3GPP), Mobile Competence Centre; 650, Route Des Lucioles; F-06921 Sophia-Antipolis Cedex; France, vol. RAN WG4, No. V11.0.0, Sep. 23, 2012 (Sep. 23, 2012), pp. 1-55, XP050649914.
International Preliminary Report on Patentability—PCT/US2014/069021, The International Bureau of WIPO—Geneva, Switzerland, Mar. 21, 2016. 9 Total Pages.

* cited by examiner

LOAD BALANCING IN NETWORK DEPLOYMENTS USING UNLICENSED SPECTRUM

CLAIM OF PRIORITY UNDER 35 U.S.C §119

The present application for patent claims priority to U.S. Provisional Application No. 61/914,650 entitled "METHODS AND APPARATUS FOR LOAD BALANCING IN NETWORK DEPLOYMENTS USING UNLICENSED SPECTRUM" filed Dec. 11, 2013, assigned to the assignee hereof and hereby expressly incorporated by reference.

BACKGROUND

Aspects of this disclosure relate generally to telecommunications, and more particularly to interference mitigation.

A wireless communication network may be deployed to provide various types of services (e.g., voice, data, multimedia services, etc.) to users within a coverage area of the network. In some implementations, one or more access points (e.g., corresponding to different cells) provide wireless connectivity for access terminals (e.g., cell phones) that are operating within the coverage of the access point(s). In some implementations, peer devices provide wireless connectively for communicating with one another.

Communication between devices in a wireless communication network may be subject to interference. For a communication between any two devices in a network, emissions of radio frequency (RF) energy by a nearby device may interfere with reception of signals at the other device. For example, a Long Term Evolution (LTE) device operating in an unlicensed RF band that is also being used by a Wi-Fi device may experience significant interference from the Wi-Fi device, and/or can cause significant interference to the Wi-Fi device.

Over-the-air interference detection is employed in some wireless communication networks in an attempt to mitigate such interference. For example, a device may periodically monitor (e.g., sniff) for energy in the RF band used by the device. Upon detection of any kind of energy, the device may back-off and refrain from accessing the RF band for a period of time.

In practice, however, there may be problems with such a back-off or "listen-before-talk" (LBT) approach, at least in its conventional implementation. For example, for an LTE system operating in an unlicensed band with a Wi-Fi co-channel scenario where it is desired to avoid interference from Wi-Fi, the detected energy in the band may not be from a Wi-Fi device, or may not be substantial. In addition, the detected energy in the band may simply be adjacent channel leakage. Consequently, an LTE device may back off transmissions in the band even when there is no Wi-Fi interference. In some wireless communication networks, inefficient utilization of available communication resources, particularly identification resources for configuration of subframes during radar detection, may lead to degradations in wireless communication. Even more, the foregoing inefficient resource utilization inhibits network devices from achieving higher wireless communication quality. Thus, improvements in interference mitigation are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Systems and methods for interference mitigation in unlicensed spectrum are disclosed. In an aspect, the method may include requesting, by a first network entity, one or more user equipments (UEs) to perform a plurality of frequency measurements, wherein the plurality of frequency measurements comprises measurements in a licensed spectrum and measurements in an unlicensed spectrum. Further, the method may include calculating a power back-off value based on the plurality of frequency measurements. Moreover, the method may include adjusting a cell coverage based on the power back-off value such that the one or more UEs are outside the cell coverage.

Further aspects provide a computer program product for interference mitigation in unlicensed spectrum comprising at least one instruction executable to cause a computer to request, by a first network entity, one or more user equipments (UEs) to perform a plurality of frequency measurements, wherein the plurality of frequency measurements comprises measurements in a licensed spectrum and measurements in an unlicensed spectrum; calculate a power back-off value based on the plurality of frequency measurements; and adjust a cell coverage based on the power back-off value such that the one or more UEs are outside the cell coverage.

Additional aspects provide an apparatus for interference mitigation in unlicensed spectrum comprises means for requesting, by a first network entity, one or more user equipments (UEs) to perform a plurality of frequency measurements, wherein the plurality of frequency measurements comprises measurements in a licensed spectrum and measurements in an unlicensed spectrum; calculating a power back-off value based on the plurality of frequency measurements; and adjusting a cell coverage based on the power back-off value such that the one or more UEs are outside the cell coverage.

In an additional aspect, an apparatus for interference mitigation in unlicensed spectrum comprises a memory storing executable instructions and a processor in communication with the memory, wherein the processor is configured to execute the instructions to request, by a first network entity, one or more user equipments (UEs) to perform a plurality of frequency measurements, wherein the plurality of frequency measurements comprises measurements in a licensed spectrum and measurements in an unlicensed spectrum; calculate a power back-off value based on the plurality of frequency measurements; and adjust a cell coverage based on the power back-off value such that the one or more UEs are outside the cell coverage.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
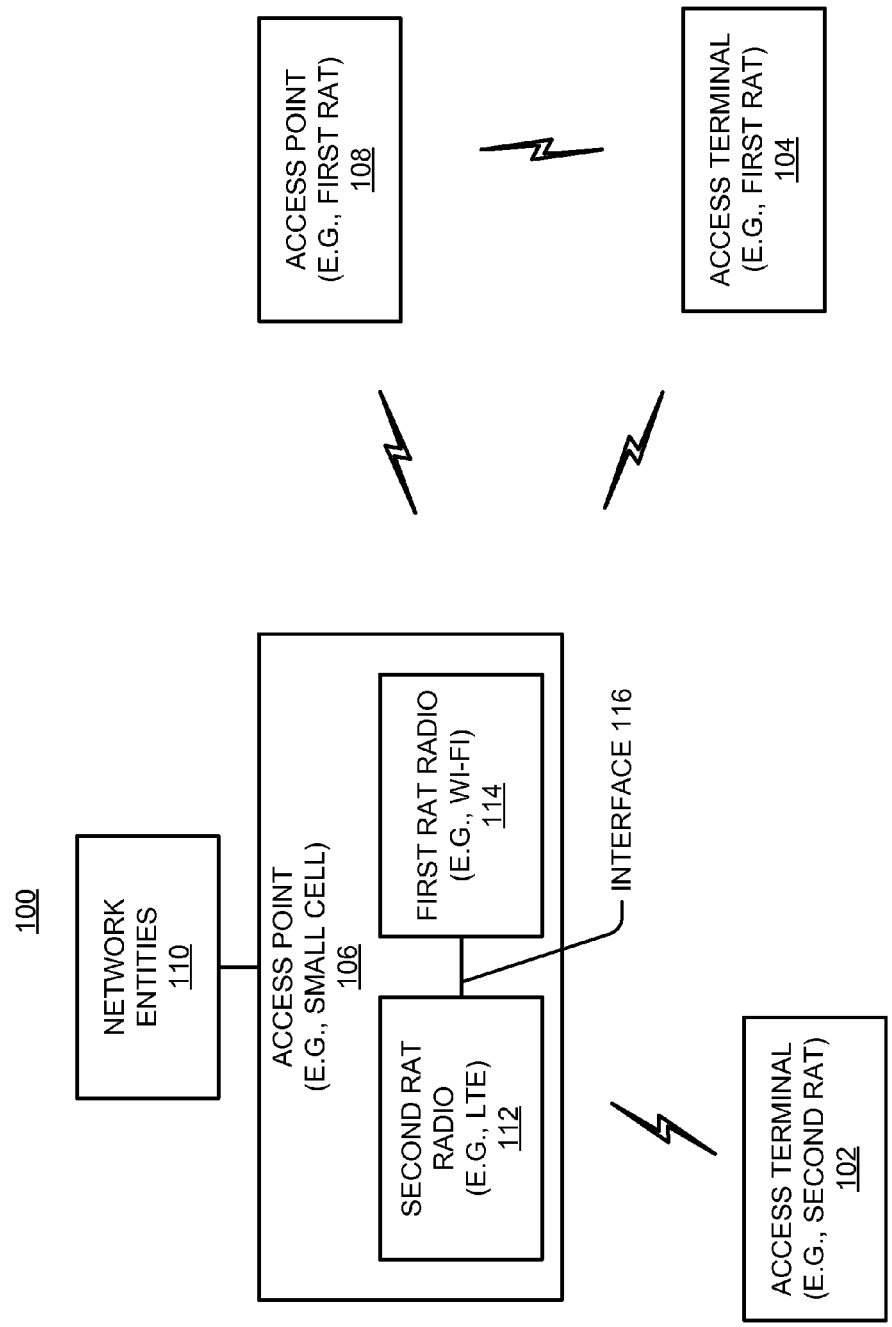
FIG. 1 is a block diagram illustrating an example of several aspects of a communication system employing co-located radios.

The disclosure relates in some aspects to interference mitigation in wireless communication systems. Specifically, in some wireless communication systems, network entities may provide coverage on a licensed spectrum and an unlicensed spectrum while other network entities may only provide coverage on the licensed spectrum. Accordingly, a user equipment (UE), operating either in carrier aggregation (CA) or supplementary downlink (SDL) mode in support of LTE/LTE Advanced over an unlicensed spectrum in addition to LTE/LTE Advanced over a licensed spectrum, has to attach with a primary cell first. For example, the UE may have to attach to a primary cell with a network entity that only provides coverage in the licensed spectrum even though the UE is within coverage of another network entity that provides coverage in both the licensed spectrum and the unlicensed spectrum. Currently, coverage range extension (CRE) and enhanced inter-cell interference coordination (eICIC) may be applied to extend the coverage of a network entity that provides coverage in both the licensed spectrum and the unlicensed spectrum. However, extending coverage in this manner may not be sufficient due to the other network entity being designated as the primary cell. In some instances, a UE served by a network entity designated as the primary cell may come in to range of another network entity providing coverage in both the licensed spectrum and the unlicensed spectrum. However, since the other network entity is not designated as the primary, the UE may be prevented from attaching to it. Additionally, the other network entity providing coverage in both spectrums may be moved to a dedicated channel on the primary cell. However, in some instances a dedicated channel for the other network entity may not exist. As a result, the unlicensed spectrum may not be utilized since the UE has access to only a single channel on the primary cell. Hence, by limiting unlicensed spectrum utilization the UE may not be able to optimize its downlink and uplink capabilities.

As such, the present methods and apparatus may adjust a cell coverage of a network entity that only provides coverage in the licensed spectrum, so as to provide the UE with the capability of attaching to another network entity that provides coverage in both the licensed spectrum and the unlicensed spectrum. A network entity that provides coverage in both licensed spectrum and the unlicensed spectrum allows for higher data rates and an enhanced broadband experience. Accordingly, in some aspects, the present methods and apparatus may provide an efficient solution, as compared to current solutions, to enable a network entity to determine that a UE is within cell coverage of another network entity that provides coverage in both the licensed spectrum and the unlicensed spectrum and to adjust its own cell coverage to enable the UE to attach to that other network entity.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, femto cells, and so on, while access terminals may be referred to or implemented as user equipment (UEs), mobile stations, and so on.

Access points in the system 100 provide access to one or more services (e.g., network connectivity) for one or more wireless terminals (e.g., the access terminal 102 or the access terminal 104) that may be installed within or that may roam throughout a coverage area of the system 100, each of which may include load balancing component 320 (FIG. 4) configured to adjust a cell coverage of an access point (e.g., network entity 306) that only provides coverage in the licensed spectrum, so as to provide an access terminal (e.g., UE 302 in FIG. 4) with the capability of attaching to another access point (e.g., network entity 304 in FIG. 4) that provides coverage in both the licensed spectrum and the unlicensed spectrum. For example, at various points in time the access terminal 102 may connect to the access point 106 or some other access point in the system 100 (not shown). Similarly, the access terminal 104 may connect to the access point 108 or some other access point.

One or more of the access points may communicate with one or more network entities (represented, for convenience, by the network entities 110), including each other, to facilitate wide area network connectivity. Two or more of such network entities may be co-located and/or two or more of such network entities may be distributed throughout a network.

A network entity may take various forms such as, for example, one or more radio and/or core network entities. Thus, in various implementations the network entities 110 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

When the access point 106 (or any other devices in the system 100) uses a first RAT to communicate on a given resource, this communication may be subjected to interference from nearby devices (e.g., the access point 108 and/or the access terminal 104) that use a second RAT to communicate on that resource. For example, communication by the access point 106 via LTE on a particular unlicensed RF band may be subject to interference from Wi-Fi devices operating on that band. For convenience, LTE on an unlicensed RF band may be referred to herein as LTE/LTE Advanced in unlicensed spectrum, or simply LTE in the surrounding context.

In some systems, LTE in unlicensed spectrum may be employed in a standalone configuration, with all carriers operating exclusively in an unlicensed portion of the wireless spectrum (e.g., LTE Standalone). In other systems, LTE in unlicensed spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding UE (e.g., an anchor licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed), and each SCell may provide additional downlink capacity as desired.

In general, LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
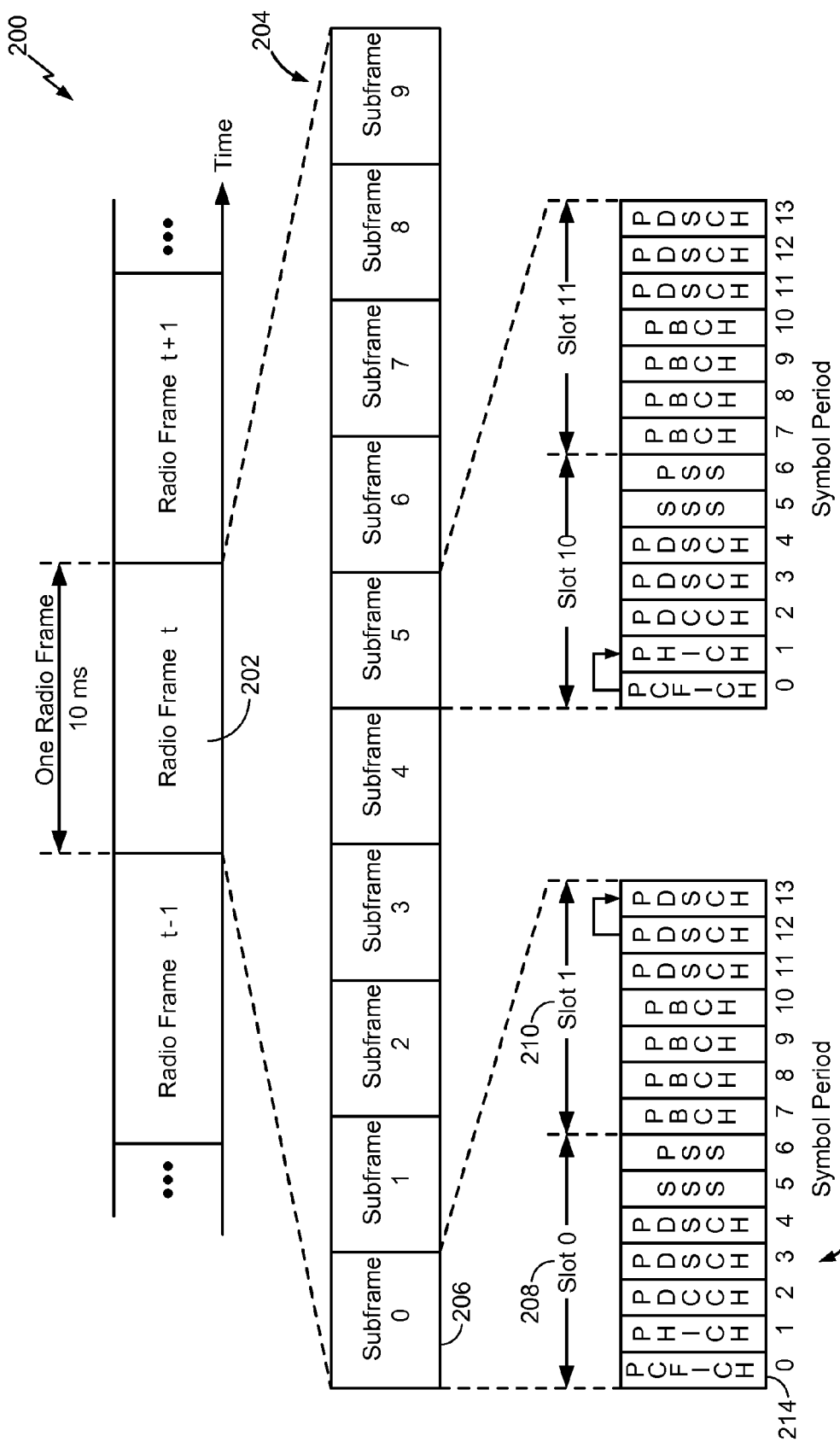
FIG. 2 shows a downlink frame structure used in LTE.
Figure 6:
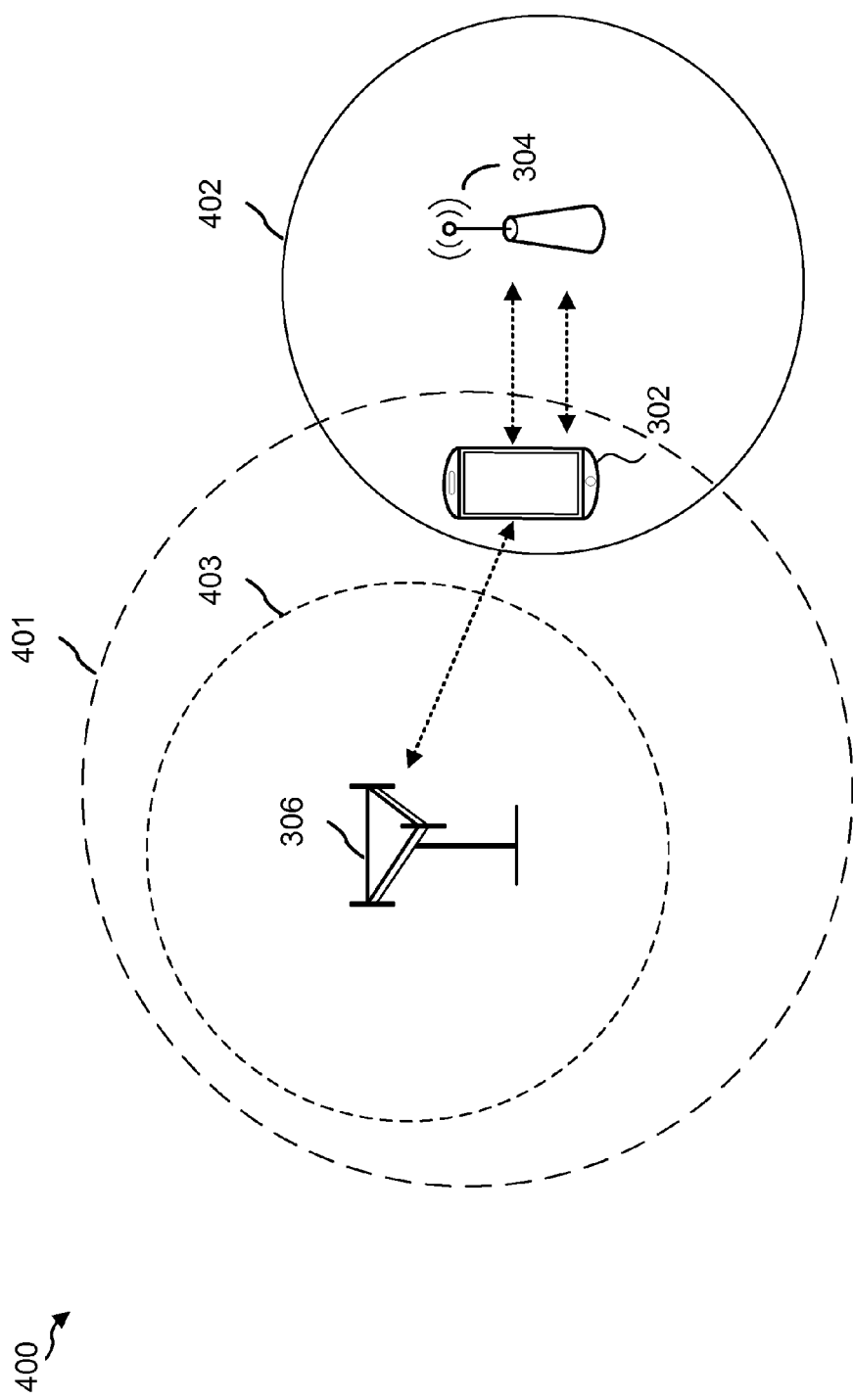
FIG. 6 is a diagram illustrating an example a range expanded cellular region in a heterogeneous network.

FIG. 2 shows a downlink frame structure 200 used in LTE. The transmission timeline for the downlink may be partitioned into units of radio frames 202, 204, 206. Each radio frame may have a predetermined duration (e.g., 10 milliseconds (ms)) and may be partitioned into 10 subframes 208 with indices of 0 through 9. Each subframe may include two slots, e.g., slots 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, the access point (referred to as an eNB) may send a Primary Synchronization Signal (PSS) and a Secondary Synchronization Signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by the access terminals (referred to as UEs) for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH may also be included in the first symbol period. Similarly, the PHICH and PDCCH may also both be in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search. A UE may be within the coverage of multiple eNBs. One of these eNBs may be selected to serve the UE. The serving eNB may be selected based on various criteria such as received power, path loss, signal-to-noise ratio (SNR), etc.

Returning to FIG. 1, the disclosure relates in some aspects to techniques referred to herein as carrier sense adaptive transmission (CSAT), which may be used to facilitate co-existence between different technologies operating on a commonly used resource (e.g., a particular unlicensed RF band or co-channel). The access point 106 includes co-located radios (e.g., transceivers) 112 and 114. The radio 112 uses a second RAT (e.g., LTE) to communicate. The radio 114 is capable of receiving signals using a first RAT (e.g., Wi-Fi). In addition, an interface 116 enables the radios 112 and 114 to communicate with one another.

These co-located radios are leveraged to enable a carrier sense multiple access-like (CSMA-like) mode of operation whereby the radio 114 repeatedly (e.g., periodically) conducts measurements on the co-channel. Based on these measurements, the radio 112 determines the extent to which the co-channel is being utilized by devices operating on the first RAT. The radio 112 is thus able to adapt its communication on the channel (using the second RAT) according to the resource utilization.

For example, if the utilization of the resource by Wi-Fi devices is high, an LTE radio may adjust one or more transmission parameters that the LTE radio uses to communicate via the co-channel such that usage of the co-channel by the LTE radio is reduced. For example, the LTE radio may reduce its transmit duty cycle, transmit power, or frequency allocation.

Conversely, if the utilization of the resource by Wi-Fi devices is low, an LTE radio may adjust one or more transmission parameters that the LTE radio uses to communicate via the co-channel such that usage of the co-channel by the LTE radio is increased. For example, the LTE radio may increase its transmit duty cycle, transmit power, or frequency allocation.

The disclosed scheme may provide several advantages. For example, by adapting communication based on signals associated with the first RAT, the second RAT may be configured to only react to utilization of the co-channel by devices that use the first RAT. Thus, interference by other devices (e.g., non-Wi-Fi devices) or adjacent channel interference may be ignored, if desired. As another example, the scheme enables a device that uses a given RAT to control how much protection is to be afforded to co-channel communications by devices that use another RAT. Also, such a scheme may be implemented in an LTE system without changing the LTE PHY or MAC. For example, these changes may be implemented by simply changing LTE software.

In some aspects, the advantages discussed herein may be achieved by adding a Wi-Fi chip or similar functionality to an LTE access point. If desired, a low functionality Wi-Fi circuit may be employed to reduce costs (e.g., the Wi-Fi circuit simply providing low-level sniffing).

As used herein, the term co-located (e.g., radios, access points, transceivers, etc.) may include in various aspects, one or more of, for example: components that are in the same housing; components that are hosted by the same processor; components that are within a defined distance of one another, or components that are connected via an interface (e.g., an Ethernet switch) where the interface meets the latency requirements of any required inter-component communication (e.g., messaging).

Figure 3:
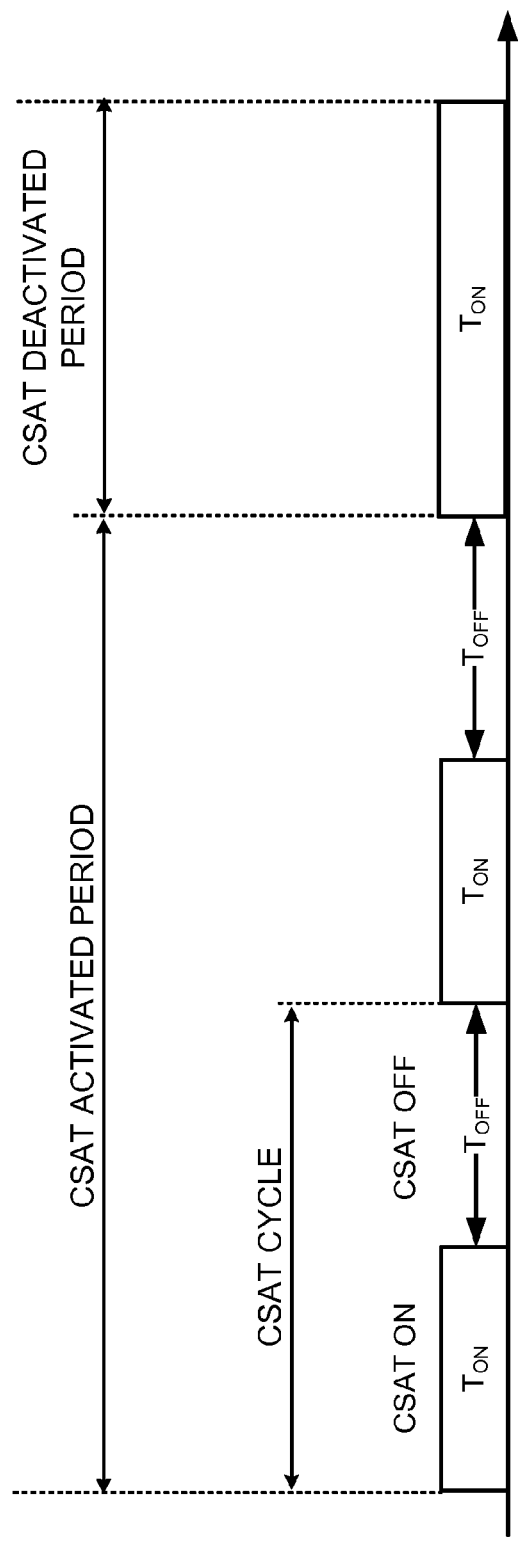
FIG. 3 is a diagram illustrating an example of carrier sense adaptive transmission (CSAT) time division multiplexing (TDM) duty cycling.

FIG. 3 illustrates an example of CSAT Time Division Multiplexed (TDM) duty cycling for LTE in unlicensed spectrum. During time $T_{ON}$, transmission on the unlicensed RF band is enabled, which may be referred to as a CSAT ON period. During time $T_{OFF}$, transmission on the unlicensed RF band is disabled, which may be referred to as a CSAT OFF period, to enable a co-located Wi-Fi radio to conduct measurements. In this way, TDM communication duty cycling for LTE in unlicensed spectrum may be implemented to create adaptable TDM transmission patterns. Aspects of the disclosure related to load balancing may also apply to LTE in unlicensed spectrum that is implemented using techniques different from CSAT TDM.

Figure 4:
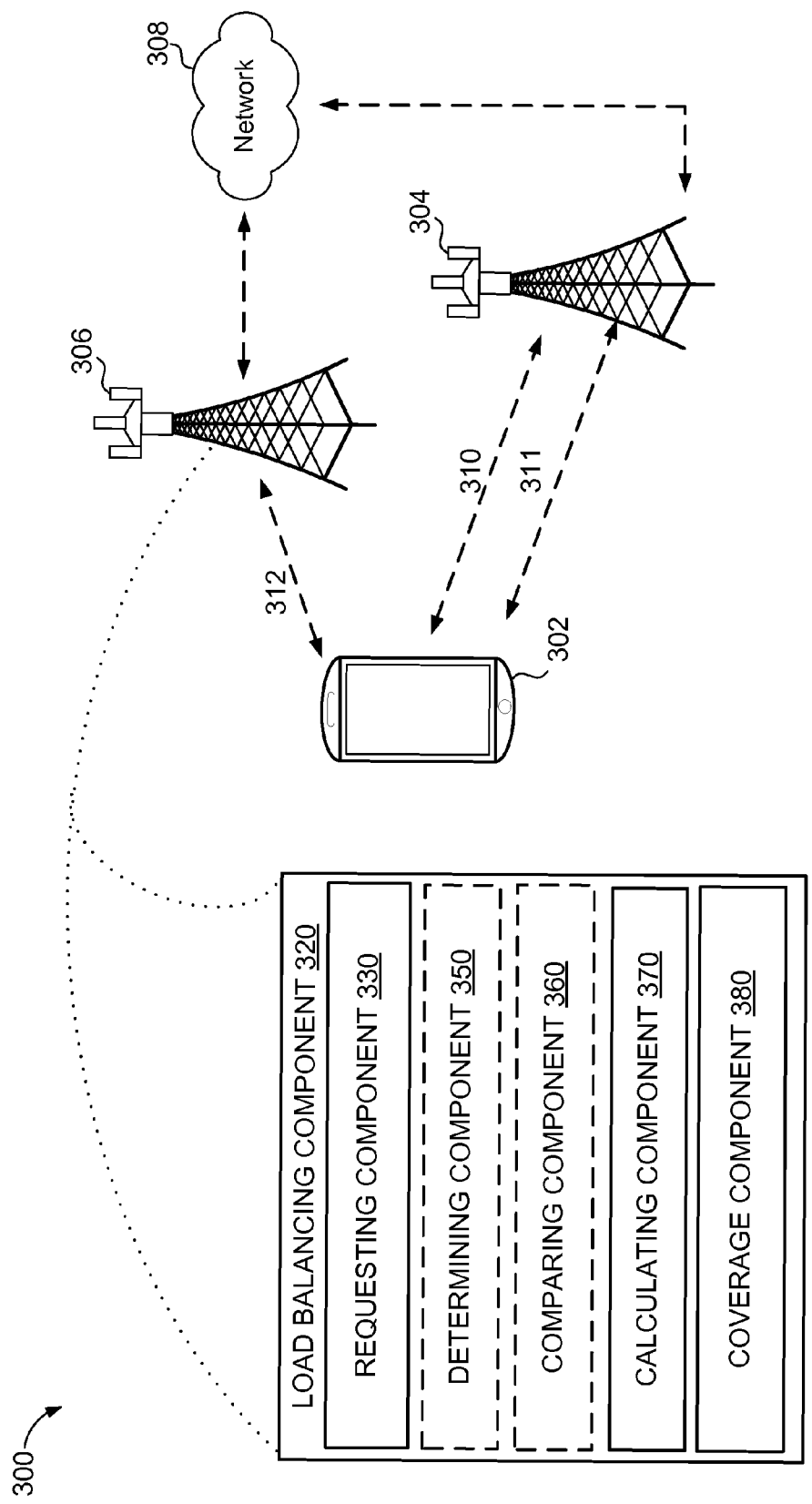
FIG. 4 is a schematic diagram illustrating an example of a communication network including an aspect of a network entity that may adjust cell coverage.

Referring to FIG. 4, in an aspect, a wireless communication system 300 includes at least one UE 302, corresponding to access terminal 102/104 (FIG. 1) in communication coverage of at least a network entity 304 and a network entity 306, each of which may correspond with access point 106 and/or 108 (FIG. 1). UE 302 may communicate with network 308 via one or both of network entity 304 and network entity 306. In some aspects, multiple UEs including UE 302 may be in communication coverage with one or more network entities, including network entity 304 and network entity 306. For instance, UE 302 may communicate with network entity 304 on or using one or more communication channels 310 on the licensed spectrum, and one or more communication channels 311 on the unlicensed spectrum. In one aspect, the unlicensed spectrum may refer to a radio frequency band used for contention-based network operations. Further, for example, UE 302 may communicate with network entity 306 on or using one or more communication channels 312 on the licensed spectrum.

It should be understood that UE 302 may communicate with one or more cells included or deployed at one or both network entity 304 and network entity 306. That is, UE 302 may select or reselect from one cell at network entity 304 to another cell at network entity 304. In other aspects, network entity 304 may alternatively be referred to as a network entity with which UE 302 maintains an RRC connected state. Additionally, UE 302 may transmit and/or receive wireless communication to and/or from network entity 304 and/or network entity 306. For example, such wireless information may include, but is not limited to, information related frequency measurements.

In some aspects, UE 302 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a wireless transmit/receive unit, a device for the Internet of Things (IoT), or some other suitable terminology.

Additionally, network entity 304 and network entity 306 may be a macrocell, picocell, femtocell, access point, relay, Node B, mobile Node B, eNode B (eNB), UE (e.g., communicating in peer-to-peer or ad-hoc mode with UE 302), or substantially any type of component that can communicate with UE 302 to provide wireless network access at the UE 302.

According to the present aspects, network entity 306 may include load balancing component 320, which may be configured to determine that a UE (e.g., UE 302) may be served by a network entity (e.g., network entity 304) that provides coverage in both the licensed spectrum and unlicensed spectrum. For example, load balancing component 320 may request one or more UEs (e.g., UE 302) to perform a plurality of frequency measurements, calculate a power back-off value based at least in part on the plurality of frequency measurements; and adjust a cell coverage (e.g., second cell) based at least in part on the power back-off value. Hence, one or more UEs (e.g., UE 302) may no longer be located within coverage of the second cell (e.g., network entity 306). As such, the one or more UEs (e.g., UE 302) may be free to attach to another cell, such as the network entity (e.g., network entity 304). As a result, the one or more UEs (e.g., UE 302) may be able to utilize both licensed spectrum and unlicensed spectrum provided by the network entity (e.g., network entity 304).

In an aspect, load balancing component 320 may include requesting component 330, which may be configured to transmit a request to one or more UEs (e.g., UE 302) to perform a plurality of frequency measurements. For example, requesting component 330 may be configured to transmit a request to one or more UEs (e.g., UE 302) to perform measurements on both the licensed spectrum and unlicensed spectrum for one or more cells (e.g., network entity 304). The measurements may include measuring intra-frequency Reference Signal Received Power (RSRP) levels of one or more network entities in the licensed spectrum and inter-frequency RSRP levels of the one or more network entities. Further, the measurements may include measuring intra-frequency Reference Signal Received Quality (RSRQ) levels of one or more network entities in the licensed spectrum and inter-frequency RSRQ levels of the one or more network entities. Additionally, UE 302 may be in a CA or SDL connected state with the second cell (e.g., network entity 306) during such measurements.

Additionally, load balancing component 320 and/or requesting component 330 may be configured to receive the plurality of frequency measurements from the one or more UEs (e.g., UE 302). For example, requesting component 330 may be configured to receive measurements including intra-frequency RSRP levels, inter-frequency RSRP levels, intra-frequency RSRQ levels, and inter-frequency RSRQ levels from the one or more UEs (e.g., UE 302) in response to transmitting the request.

Load balancing component 320 may optionally include determining component 350, which may be configured to determine whether the one or more UEs (e.g., UE 302) have access to the licensed spectrum and the unlicensed spectrum provided by one or more network entities (e.g., network entity 304) based at least in part on the plurality of frequency measurements. For example, determining component 350 may be configured to receive the plurality of measurements from requesting component 330, and determine based on the presence of measurements including intra-frequency RSRP levels, inter-frequency RSRP levels, intra-frequency RSRQ levels, and inter-frequency RSRQ levels whether the one or more UEs (e.g., UE 302) have access to the licensed spectrum and the unlicensed spectrum.

In additional aspects, load balancing component 320 may optionally include comparing component 360, which may be configured to determine whether any one of the plurality of measurements meets or exceeds a threshold (e.g., a power threshold). For example, comparing component 360 may be configured to determine whether any one of the plurality of measurements meets or exceeds a power threshold prior to calculating the power-back off value based on the plurality of measurements. For example, comparing component 360 may receive the measurements from requesting component 330 or determining component 350, and before transmitting them, may compare them against the power threshold to determine whether the one or more UEs (e.g., UE 302) have the potential to be offloaded to one or more network entities (e.g., network entity 304).

Further, load balancing component 320 may include calculating component 370, which may be configured to calculate a power back-off value (e.g., an amount by which transmission power is to be reduced) based at least in part on the plurality of frequency measurements. In some aspects, the calculating component 370 may receive the measurements from comparing component 360. As such, calculating component 370 may base its calculations on intra-frequency RSRP levels, inter-frequency RSRP levels, intra-frequency RSRQ levels, and inter-frequency RSRQ levels. Moreover, calculating component 370 may base its calculation of the power back-off value on whether the one or more UEs (e.g., UE 302) are in Network Listen mode on both the licensed spectrum and unlicensed spectrum. As such, calculating component 370 may calculate only based on the one or more of the plurality of measurements that comparing component 360 determined met or exceeded the power threshold. Therefore, power back-off calculations may be performed only for UEs (e.g., UE 302) having access to both licensed spectrum and unlicensed spectrum.

Additionally, load balancing component 320 may include coverage component 380, which may be configured to adjust a cell coverage of network entity 306 based at least in part on the power back-off value calculated by calculating component 370. Specifically, for example, coverage component 380 may be configured to adjust (e.g., reduce) the transmit power, so one or more UEs (e.g., UE 302) may no longer be located within coverage of the network entity (e.g., network entity 306). As such, the one or more UEs (e.g., UE 302) may be free to attach to another cell, such as the network entity (e.g., network entity 304). As a result, the one or more UEs (e.g., UE 302) will be able to utilize both licensed spectrum and unlicensed spectrum provided by the network entity (e.g., network entity 304).

Figure 5:
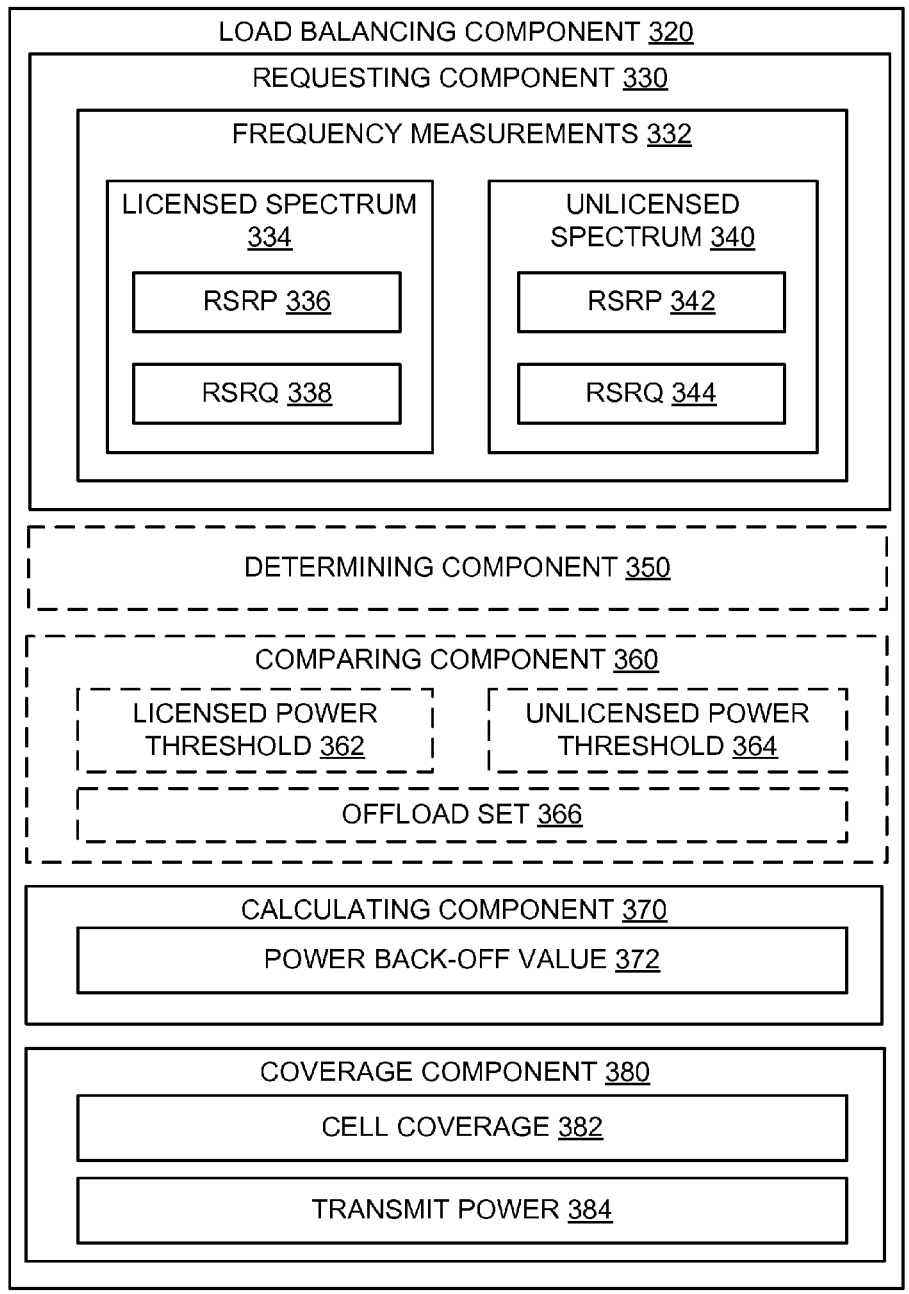
FIG. 5 is a schematic diagram illustrating an example of an aspect of load balancing components in a network entity.

FIG. 5 is a schematic diagram of an aspect of the load balancing component 320, which reside in network entity 306 of FIG. 4. Generally, load balancing component 320 may reside at a network entity (e.g., network entities 304 and/or 306) and may be configured to manage load balancing parameters for the plurality of UEs (e.g., UE 302) assigned to the network entity 306.

Specifically in an aspect, load balancing component 320 may include requesting component 330, which may be configured to request one or more UEs (e.g., UE 302 in FIG. 4) to perform a plurality of frequency measurements 332. For example, requesting component 330 may request one or more UEs that are located within its cell coverage area to perform frequency measurements 332 in a licensed spectrum 334 and an unlicensed spectrum 340. In an instance, requesting component 330 may request one or more UEs to perform frequency measurements 332 in the licensed spectrum 334 and unlicensed spectrum 340 of neighbor cells (e.g., a second network entity such as network entity 304 if load balancing component 320 resides at network entity 306 as shown in FIG. 4). In some instances, the frequency measurements 332 may comprise measurements of intra-frequency Reference Signal Received Power (RSRP) levels 336 and of intra-frequency Reference Signal Received Quality (RSRQ) levels 338 of a neighbor cell (e.g., network entity 304) in the licensed spectrum 334. Additionally, the frequency measurements 332 may comprise measurements of inter-frequency RSRP levels 342 and of inter-frequency RSRQ levels 344 of a neighbor cell (e.g., network entity 304) in the unlicensed spectrum 340. These frequency measurements 332 of RSRP 336 and RSRQ 338 levels correspond to the signal strength and quality of neighbor cells. In general, RSRP corresponds to the average received power over the resource elements that carry cell-specific reference signals within certain frequency bandwidth. RSRQ corresponds to the quality of the received reference signal, and in certain instances, provides additional information when the RSRP is not sufficient to make a reliable handover or cell reselection decision. RSRP may be applicable in both Radio Resource Control (RRC) idle and RRC connected modes, while RSRQ may be only applicable in RRC connected mode. In the procedure of cell selection and cell reselection in idle mode, RSRP may be used.

In another aspect, load balancing component 320 may optionally include determining component 350, which may be configured to determine whether the one or more UEs (e.g., UE 302 in FIG. 4) have access to a second network entity (e.g., network entity 304) over both the licensed spectrum 334 and the unlicensed spectrum 340. For example, determining component 350 may determine whether UE 302 has access to network entity 304 based on the frequency measurements 332. In an instance, requesting component 330 may receive the plurality of frequency measurements 332 from UE 302 including measurements of intra-frequency RSRP 336 and RSRQ 338 levels and measurements of inter-frequency RSRP 342 and RSRQ 344 levels, and determining component 350 may make a determination whether UE 302 would be able to select an neighbor cell to attach to (e.g., network entity 304). The neighbor cell must provide coverage on both the licensed spectrum 334 and the unlicensed spectrum 340 (e.g., communication channels 310 and 311). Determining component 350 may determine whether the frequency measurements 332 indicate whether network entity 304 provides cell coverage for UE 302. In instances where determining component 350 determines that frequency measurements 332 indicate that network entity 304 does not provide cell coverage for UE 302, calculating component 370 is prevented from calculating the power back-off value 372.

In an additional aspect, load balancing component 320 may optionally include comparing component 360, which may be configured to compare the frequency measurements 332 with power thresholds. For example, comparing component 360 may compare measurements of intra-frequency RSRP 336 and RSRQ 338 levels and measurements of inter-frequency RSRP 342 and RSRQ 344 levels that UE 302 made with a power threshold 362 in order to determine whether the measurements in the licensed spectrum 334 satisfy the licensed power threshold 362, and whether the measurements in the unlicensed spectrum 340 satisfy the unlicensed power threshold 364. In some instances, UE 302 may be located within cell coverage of network entity 304, but only within coverage of the licensed spectrum 334 and not of the unlicensed spectrum 340. As such, comparing component 360 compares measurements of intra-frequency RSRP 336 and RSRQ 338 levels with the licensed power threshold 362 in order to determine that there is sufficient cell coverage in the licensed spectrum 334 provided by network entity 304. Further, comparing component 360 compares measurements of inter-frequency RSRP 342 and RSRQ 344 levels with unlicensed power threshold 364 in order to determine that there is sufficient cell coverage n the unlicensed spectrum 340 provided by network entity 304. Comparing component 360 prevents UE 302 from unnecessarily selecting network entity 304 when UE 302 is not located within range of the cell coverage provided by network entity 304 in the unlicensed spectrum 340 even if network entity 304 provides cell coverage in the licensed spectrum 334.

As a result, comparing component 360 may be configured to place one or more UEs (e.g., UE 302) into an offload set 366 based on comparing the frequency measurements 332 with the power thresholds. If the frequency measurements 332 of a specific UE (e.g., UE 302) satisfy both licensed power threshold 362 and unlicensed power threshold 364 then comparing component 360 places that specific UE into offload set 366. In some instances, offload set 366 designates UEs (e.g., UE 302) that are to be offloaded onto a neighbor cell (e.g., network entity 304) as a result of adjusting the cell coverage of network entity 306. UEs not placed into the offload set 366 are designated as UEs that will remain within cell coverage of network entity 306 even after cell coverage 382 is adjusted.

In another aspect, load balancing component 320 may include calculating component 370, which may be configured to calculate a power back-off value 372. For example, calculating component 370 may calculate a power back-off value 372 corresponding to one or more neighbor cells based on the plurality of frequency measurements 332. In some instances, calculating component 370 may calculate the power back-off value 372 based on measurements of intra-frequency RSRP 336 and RSRQ 338 levels and measurements of inter-frequency RSRP 342 and RSRQ 344 levels that UE 302 made. In other instances, calculating component 370 may calculate the power back-off value 372 in order for a predetermined percentage and/or number of UEs to no longer be within cell coverage of network entity 306. The power back-off value 372 may be used to adjust the cell coverage 382 of network entity 306. In an instance, a positive power back-off value 372 may decrease the cell coverage 382 of network entity 306 where as a negative power back-off value 372 may increase the cell coverage 382 of network entity 306. Decreasing the cell coverage 382 may decrease the physical area that network entity 306 provides cell coverage. The power back-off value 372 may be calculated in relation to the number of UEs within cell coverage 382 of network entity 306 and the index of the strongest neighbor cell in terms of intra-frequency signal strength. Calculating component 370 may calculate the power back-off value 372 for each neighbor cell (e.g., network entity 304). Each neighbor cell may be determined based on measurements of intra-frequency RSRP 336 and RSRQ 338 levels and measurements of inter-frequency RSRP 342 and RSRQ 344 levels that each UE (e.g., UE 302) made. For instance, UE 302 may have made a plurality of frequency measurements 332 including frequency measurements 332 for one or more neighbor cells. The plurality of frequency measurements 332 may comprise an indication as to which neighbor cell they are associated with, so that the plurality of frequency measurements 332 that the plurality of UEs made may be correctly associated with one or more neighbor cells. As a result, each power back-off value 372 may be compared in order to determine the strongest neighbor cell. In an optional instance, calculating component 370 may be configured to calculate the one or more power back-off values 372 based only on the UEs within the offload set 366. As such, only the UEs designated to be offloaded from cell coverage 382 of network entity 306 may be used to calculate the power back-off value 372. Calculating component 370 may be configured not to take into consideration UEs designated to remain within cell coverage 382 of network entity 306 when calculating the one or more power back-off values 372.

In a further aspect, load balancing component 320 may include coverage component 380, which may be configured to adjust the cell coverage 382 of network entity 306 based on the power back-off value 372 such that one or more UEs (e.g., UE 302) are outside the cell coverage 382. For example, coverage component 380 may adjust the transmit power 384 based on the power back-off value 372. In an instance, power back-off value 372 may be a positive value (e.g., greater than zero), and thereby cause the transmit power 384 to decrease in value. As a result of the transmit power 384 decreasing in value, cell coverage 382 will be reduced since cell coverage is directly proportional to transmit power. The level of reduction in cell coverage 382 based on the power back-off value 372 may correspond to the calculated percentage and/or number of UEs determined to be offloaded onto a neighbor cell (e.g., network entity 304). For instance, the cell coverage 382 may be adjust so that the calculated percentage and/or number of UEs within licensed and unlicensed cell coverage of a neighbor cell (e.g., network entity 304) are no longer served by network entity 306. As such, the one or more UEs (e.g., UE 302) may be free to attach to the neighbor cell (e.g., network entity 304). As a result, the one or more UEs (e.g., UE 302) will be able to utilize both the licensed spectrum 334 and unlicensed spectrum 340 provided by neighbor cell (e.g., network entity 304).

FIG. 6 is a diagram 400 illustrating a range expanded cellular region (e.g., cell coverage) in a heterogeneous network (Hetnet). A network entity 306 including load balancing component 320 as in FIG. 4, may have a range reduction cellular region 403 that is reduced or decreased from the cellular region 401 through a power management coordination, and optionally enhanced inter-cell interference coordination between a lower power class eNB such as a network entity 304 and the macro network entity 306 and through interference cancelation performed by the UE 302. In enhanced power management coordination, the network entity 306 receives information from the UE 302 regarding frequency measurements. The information allows the network entity 304 to serve the UE 302 in the cellular region 402 and to accept a handoff of the UE 302 from the macro network entity 306 as the UE 302 leaves the range reduced cellular region 403 and enters region 402. In this example, when the UE 302 leaves the range reduced region 403 (e.g., LTE/LTE Advanced over licensed spectrum coverage area) and enters region 402, the UE 302 may be provided with access to the network entity 304 via both LTE/LTE Advanced over licensed spectrum and LTE/LTE Advanced over unlicensed spectrum).

Figure 7:
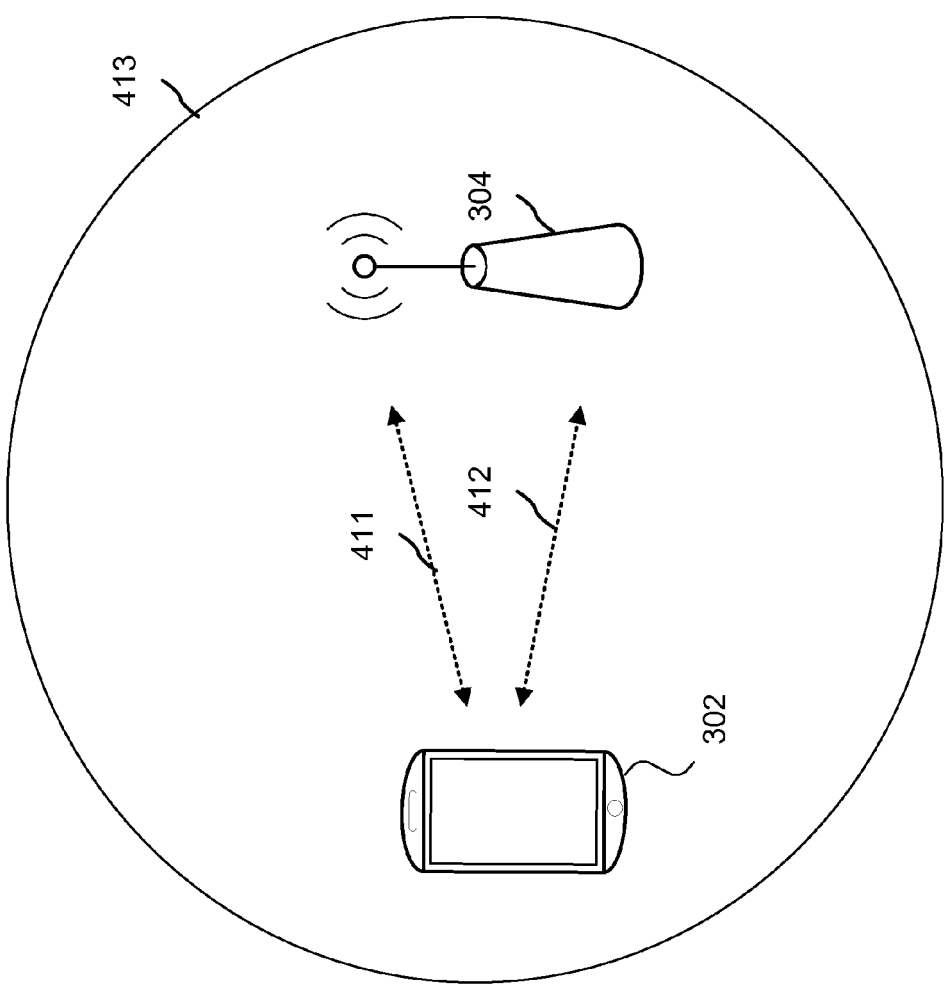
FIG. 7 is a diagram illustrating an example of a carrier aggregation network according to an aspect of the present disclosure.

FIG. 7 is a diagram 410 illustrating a carrier aggregation (CA) network. A network entity 306 including load balancing component 320 as in FIG. 4 provides licensed spectrum 411 and unlicensed spectrum 412 uplink and downlink coverage to a UE 302. In a CA network, a UE (e.g., UE 302) that is in cellular region 413 may be served by network entity 304, and have licensed uplink and downlink coverage that are supplemented or aggregated with by unlicensed uplink and downlink coverage.

Figure 8:
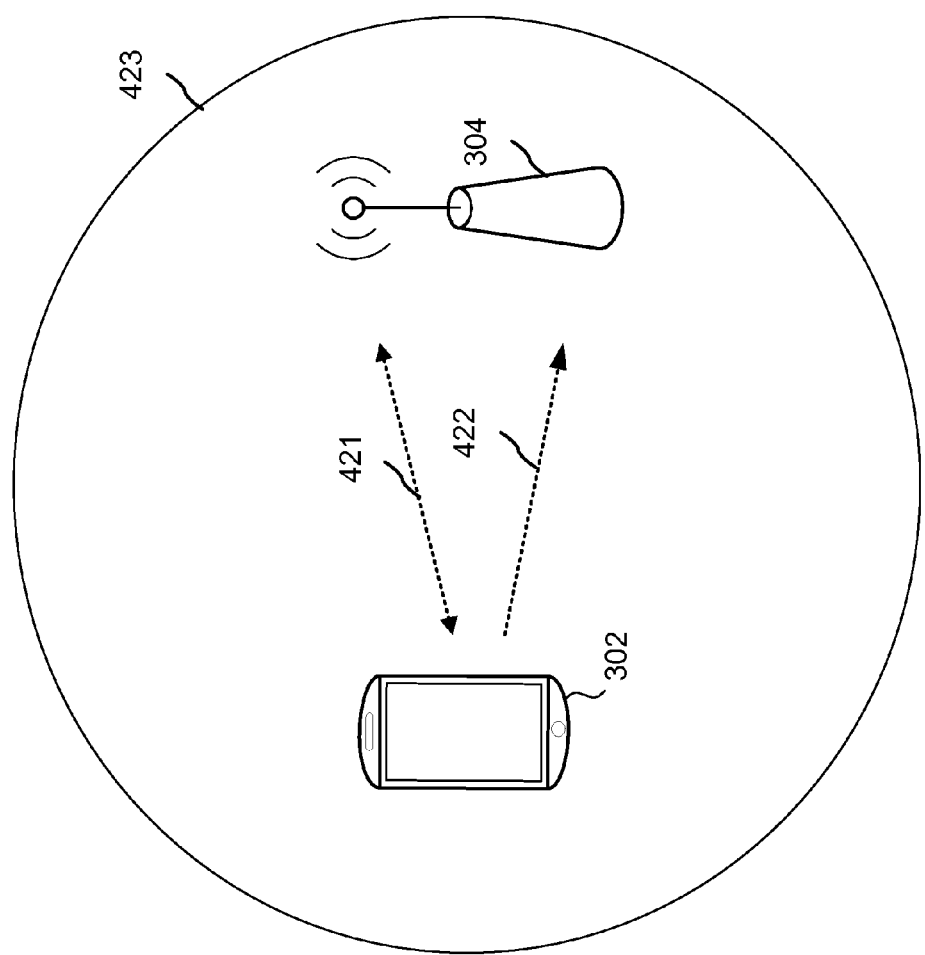
FIG. 8 is a diagram illustrating an example of a supplemental downlink (DL) network according to an aspect of the present disclosure

FIG. 8 is a diagram 420 illustrating a supplementary downlink (SDL) network. A network entity 304, similar to or the same as network entity 306 including load balancing component 320 as in FIG. 4 provides licensed spectrum 421 uplink and downlink coverage and unlicensed spectrum 422 downlink coverage to a UE 302. In a SDL network, a UE (e.g., UE 302) that is in cellular region 423 may be served by network entity 304, and have licensed uplink and downlink coverage that are supplemented by unlicensed downlink coverage.

Figure 9:
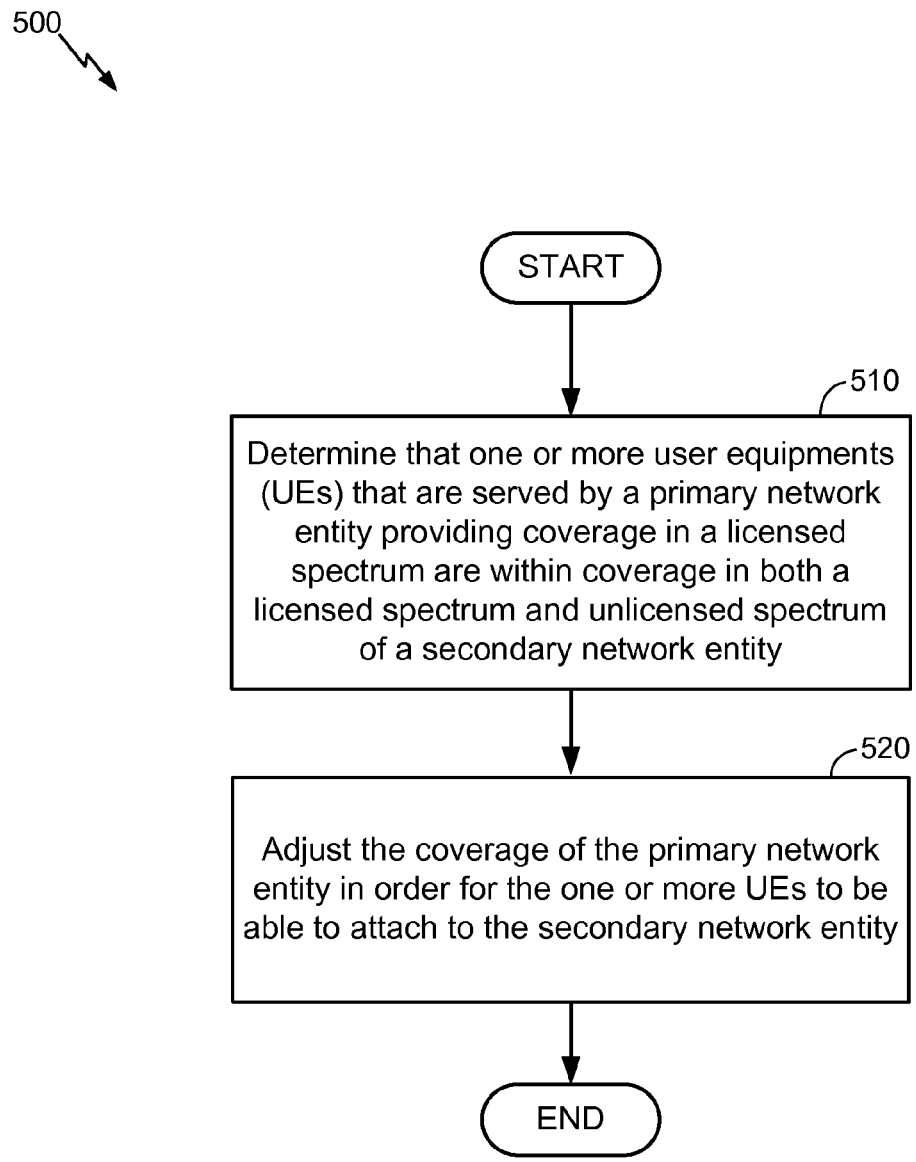
FIG. 9 is a flow diagram illustrating an example method of an aspect for load balancing in a communication network.
Figure 10:
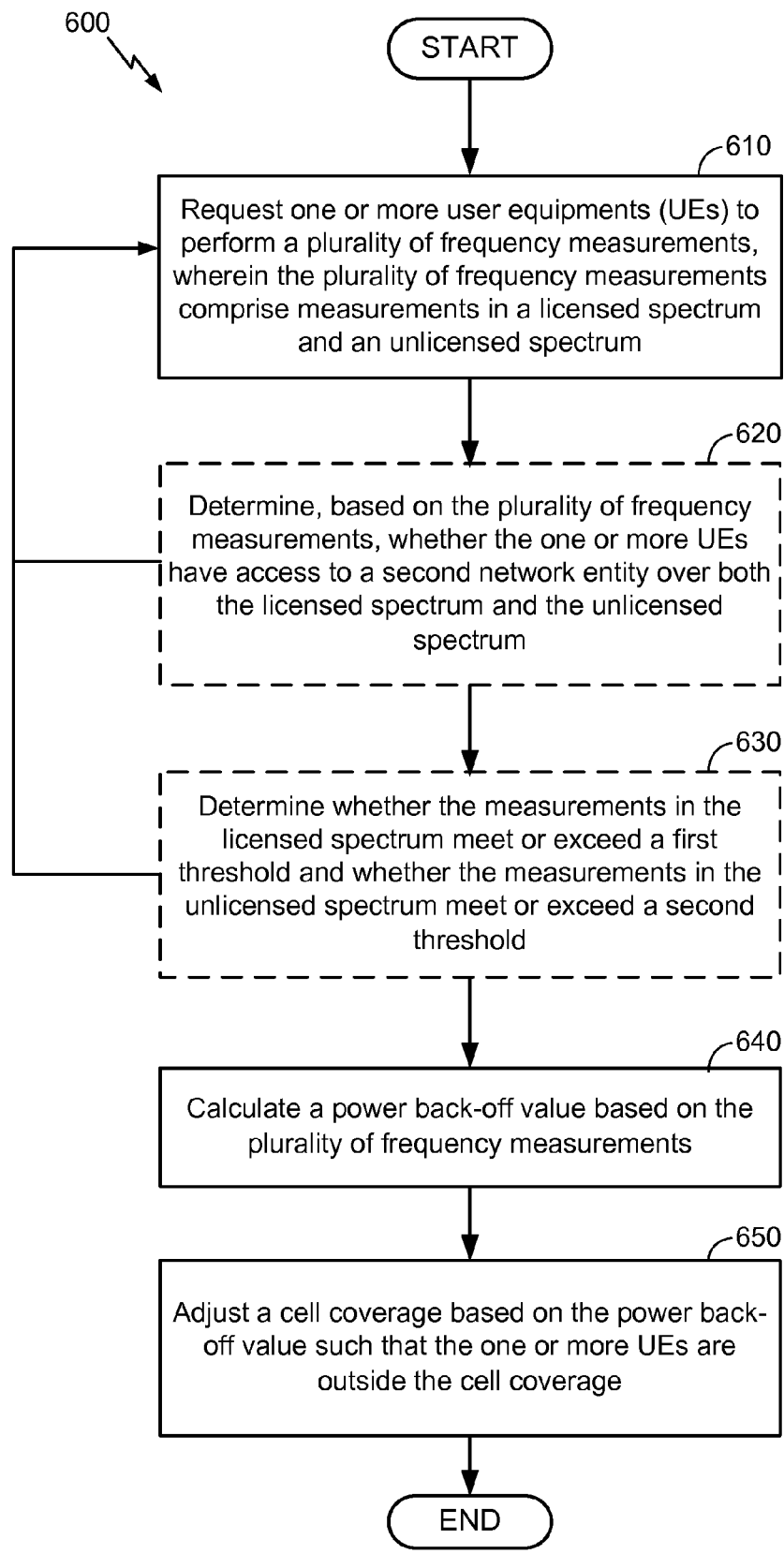
FIG. 10 is a flow diagram illustrating an example method of another aspect for load balancing in a communication network.

Referring to FIGS. 9 and 10, the methods are shown and described as a series of acts for purposes of simplicity of explanation. However, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

FIG. 9 is a flow chart 500 of a method of wireless communication. The method may be performed by a network entity, such as network entity 306 including load balancing component 320 as in FIG. 4, for adjusting a cell coverage of the network entity in order to permit a UE (e.g., UE 302) to attach to a network entity 304 providing coverage in both a licensed spectrum 334 and unlicensed spectrum 340.

In an aspect, at block 510, method 500 may include determining that one or more user equipments (UEs) that are served by a primary network entity providing coverage in a licensed spectrum are within coverage in both a licensed spectrum and unlicensed spectrum of a secondary network entity. For example, as described herein, load balancing component 320 (FIG. 4) may be configured to determine that one or more UEs (e.g., UE 302) that are served by a primary network entity (e.g., network entity 306) providing cell coverage 382 in a licensed spectrum 334 are within coverage in both a licensed spectrum 334 and unlicensed spectrum 340 of a secondary network entity (e.g., network entity 304).

Further, at block 520, method 500 may include adjusting the coverage of the primary network entity in order for the one or more UEs to be able to attach to the secondary network entity. For example, as described herein, load balancing component 320 (FIG. 4) may be configured to adjust the cell coverage of the primary network entity (e.g., network entity 306) in order for the one or more UEs (e.g., UE 302) to be able to attach to the secondary network entity (e.g., network entity 304).

FIG. 10 is a flow chart 600 of a method of wireless communication. The method may be performed by a network entity, such as network entity 306 including load balancing component 320 as in FIG. 4, for adjusting a cell coverage of the network entity in order to permit a UE (e.g., UE 302) to attach to a network entity 304 providing coverage in both a licensed spectrum 334 and unlicensed spectrum 340.

In an aspect, at block 610, method 600 may include requesting one or more UEs to perform a plurality of frequency measurements. For example, as described herein, load balancing component 320 may execute requesting component 330 to request one or more UEs (e.g., UE 302) to perform a plurality of frequency measurements 332 on both the licensed spectrum 334 and unlicensed spectrum 340 for one or more cells (e.g., cell coverage provided by network entity 304). For example, measurements may include intra-frequency RSRP levels 336, inter-frequency RSRP levels 342, intra-frequency RSRQ levels 338, and inter-frequency RSRQ levels 344.

In a further aspect, at block 620, method 600 may optionally include determining based on the plurality of frequency measurements, whether the one or more UEs have access to a second network entity over both the licensed spectrum and the unlicensed spectrum. For example, as described herein, load balancing component 320 may execute determining component 350 to determine based on the plurality of frequency measurements 332, whether the one or more UEs (e.g., UE 302) have access to a second network entity (e.g., network entity 304) over both the licensed spectrum 334 and the unlicensed spectrum 340. If one or more UEs (e.g., UE 302) do not have access to a second network entity (e.g., network entity 304) over both the licensed spectrum 334 and the unlicensed spectrum 340 then method 600 returns to block 610.

However, if one or more UEs (e.g., UE 302) have access to a second network entity (e.g., network entity 304) over both the licensed spectrum 334 and the unlicensed spectrum 340 then method 600 proceeds to block 630. In an aspect, at block 630, method 600 may optionally include determining whether the measurements in the licensed spectrum meet or exceed a first threshold and whether the measurements in the unlicensed spectrum meet or exceed a second threshold. For example, as described herein, load balancing component 320 may execute comparing component 360 to determine whether the measurements in the licensed spectrum 334 meet or exceed a first threshold (e.g., licensed power threshold 362) and whether the measurements in the unlicensed spectrum 340 meet or exceed a second threshold (e.g., unlicensed power threshold 364). If the measurements in the licensed spectrum 334 fail to meet or exceed a first threshold (e.g., licensed power threshold 362) and if the measurements in the unlicensed spectrum 340 fail to meet or exceed a second threshold (e.g., unlicensed power threshold 364) then method 600 returns to block 610.

However, if the measurements in the licensed spectrum 334 meet or exceed a first threshold (e.g., licensed power threshold 362) and if the measurements in the unlicensed spectrum 340 meet or exceed a second threshold (e.g., unlicensed power threshold 364) then method 600 proceed to block 640. In an aspect, at block 640, method 600 may include calculating a power back-off value based on the plurality of frequency measurements. For example, as described herein, load balancing component 320 may execute calculating component 370 to calculate a power back-off value 372 based on the plurality of frequency measurements 332.

In an aspect, at block 650, method 600 includes adjusting a cell coverage based at least in part on the power back-off value. For example, as described herein, load balancing component 320 may execute coverage component 380 to adjust a cell coverage 382 of a network entity (e.g., network entity 306) based at least in part on the power back-off value 372. Specifically, for example, coverage component 380 may be configured to adjust (e.g., reduce) the transmit power 384, so one or more UEs (e.g., UE 302) may no longer be located in cell coverage 382 of the network entity (e.g., network entity 306). As such, the one or more UEs (e.g., UE 302) may be free to attach to a neighbor cell, such as network entity 304. As a result, the one or more UEs (e.g., UE 302) will be able to utilize both licensed spectrum 334 and unlicensed spectrum 340 provided by network entity 304.

Figure 11:
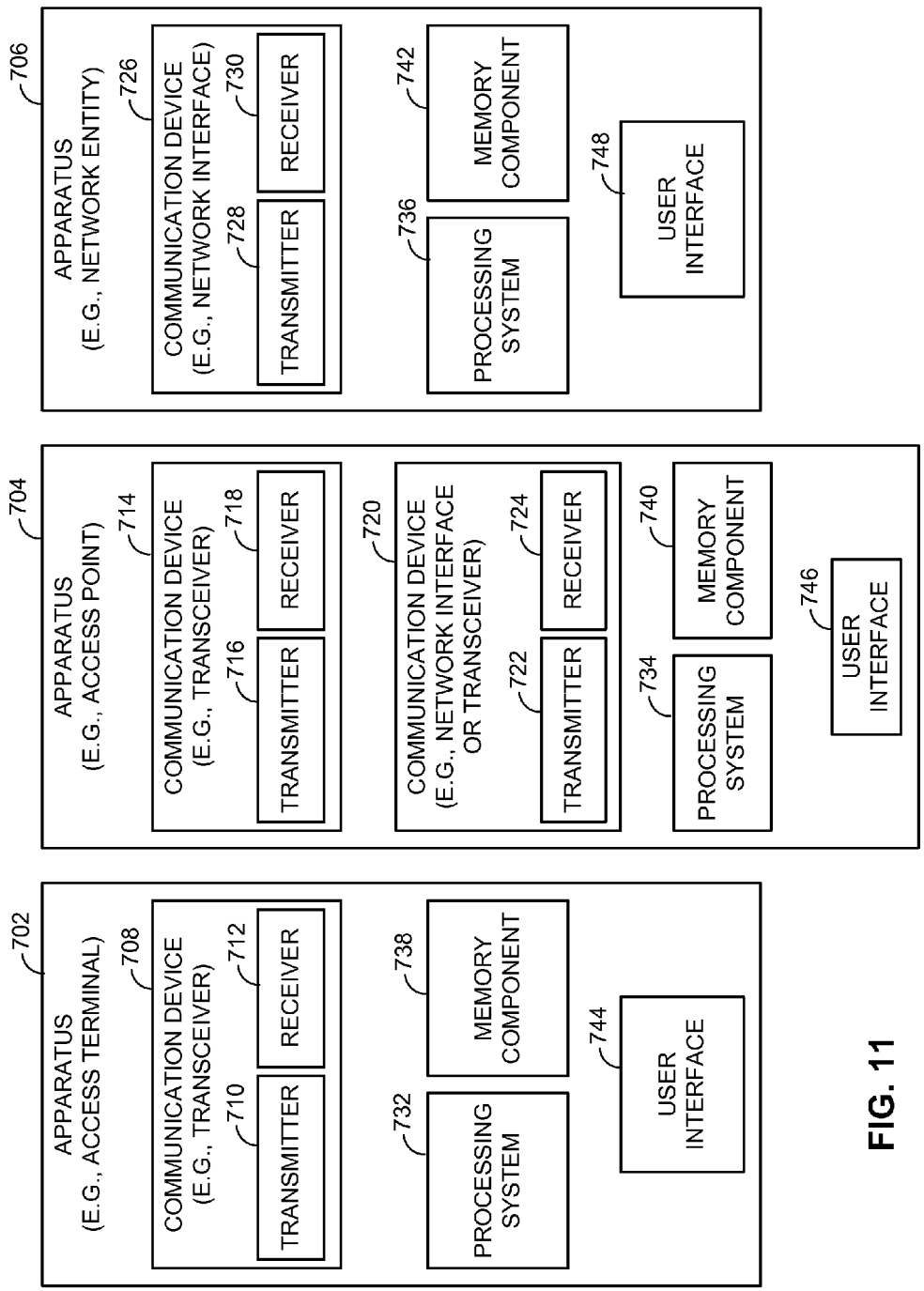
FIG. 11 is a block diagram illustrating an example of several sample aspects of components that may be employed in communication nodes.

FIG. 11 illustrates several sample components (represented by corresponding blocks) that may be incorporated into an apparatus 702 corresponding to UE 302 (FIG. 4), an apparatus 704 corresponding to network entity 304/306, which may include load balancing component 320, and an apparatus 706 (e.g., corresponding to an access terminal, an access point, and a network entity, respectively) to support communication adaptation operations as taught herein. It should be appreciated that these components may be implemented in different types of apparatuses in different implementations (e.g., in an ASIC, in an SoC, etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 702 and the apparatus 704 each include at least one wireless communication device (represented by the communication devices 708 and 714 (and the communication device 720 if the apparatus 704 is a relay)) for communicating with other nodes via at least one designated radio access technology. Each communication device 708 includes at least one transmitter (represented by the transmitter 710) for transmitting and encoding signals (e.g., messages, indications, information, and so on) and at least one receiver (represented by the receiver 712) for receiving and decoding signals (e.g., messages, indications, information, pilots, and so on). Similarly, each communication device 714 includes at least one transmitter (represented by the transmitter 716) for transmitting signals (e.g., messages, indications, information, pilots, and so on) and at least one receiver (represented by the receiver 718) for receiving signals (e.g., messages, indications, information, and so on). If the apparatus 704 is a relay access point, each communication device 720 may include at least one transmitter (represented by the transmitter 722) for transmitting signals (e.g., messages, indications, information, pilots, and so on) and at least one receiver (represented by the receiver 724) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 704 comprises a network listen module.

The apparatus 706 (and the apparatus 704 if it is not a relay access point) includes at least one communication device (represented by the communication device 726 and, optionally, 720) for communicating with other nodes. For example, the communication device 726 may comprise a network interface that is configured to communicate with one or more network entities via a wire-based or wireless backhaul. In some aspects, the communication device 726 may be implemented as a transceiver configured to support wire-based or wireless signal communication. This communication may involve, for example, sending and receiving: messages, parameters, or other types of information. Accordingly, in the example of FIG. 11, the communication device 726 is shown as comprising a transmitter 728 and a receiver 730. Similarly, if the apparatus 704 is not a relay access point, the communication device 720 may comprise a network interface that is configured to communicate with one or more network entities via a wire-based or wireless backhaul. As with the communication device 726, the communication device 720 is shown as comprising a transmitter 722 and a receiver 724.

The apparatuses 702, 704, and 706 also include other components that may be used in conjunction with communication adaptation operations as taught herein. The apparatus 702 includes a processing system 732 for providing functionality relating to, for example, communicating with an access point to support communication adaptation as taught herein and for providing other processing functionality. The apparatus 704 includes a processing system 734 for providing functionality relating to, for example, communication adaptation as taught herein and for providing other processing functionality. The apparatus 706 includes a processing system 736 for providing functionality relating to, for example, communication adaptation as taught herein and for providing other processing functionality. The apparatuses 702, 704, and 706 include memory devices 738, 740, and 742 (e.g., each including a memory device), respectively, for maintaining information (e.g., information indicative of reserved resources, thresholds, parameters, and so on). In addition, the apparatuses 702, 704, and 706 include user interface devices 744, 746, and 748, respectively, for providing indications (e.g., audible and/or visual indications) to a user and/or for receiving user input (e.g., upon user actuation of a sensing device such a keypad, a touch screen, a microphone, and so on).

For convenience, the apparatus 702 is shown in FIG. 11 as including components that may be used in the various examples described herein. In practice, the illustrated blocks may have different functionality in different aspects.

The components of FIG. 11 may be implemented in various ways. In some implementations, the components of FIG. 11 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 708, 732, 738, and 744 may be implemented by processor and memory component(s) of the apparatus 702 (e.g., by execution of appropriate code and/or by appropriate configuration of processor components). Similarly, some or all of the functionality represented by blocks 714, 720, 734, 740, and 746 may be implemented by processor and memory component(s) of the apparatus 704 (e.g., by execution of appropriate code and/or by appropriate configuration of processor components). Also, some or all of the functionality represented by blocks 726, 736, 742, and 748 may be implemented by processor and memory component(s) of the apparatus 706 (e.g., by execution of appropriate code and/or by appropriate configuration of processor components).

Some of the access points referred to herein may comprise low-power access points. In a typical network, low-power access points (e.g., femto cells) are deployed to supplement conventional network access points (e.g., macro access points). For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). In general, these low-power access points provide more robust coverage and higher throughput for access terminals in the vicinity of the low-power access points.

As used herein, the term low-power access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each low-power access point has a transmit power (e.g., as defined above) that is less than a transmit power (e.g., as defined above) of the macro access point by a relative margin (e.g., 10 dBm or more). In some implementations, low-power access points such as femto cells may have a maximum transmit power of 20 dBm or less. In some implementations, low-power access points such as pico cells may have a maximum transmit power of 24 dBm or less. It should be appreciated, however, that these or other types of low-power access points may have a higher or lower maximum transmit power in other implementations (e.g., up to 1 Watt in some cases, up to 10 Watts in some cases, and so on).

Typically, low-power access points connect to the Internet via a broadband connection (e.g., a digital subscriber line (DSL) router, a cable modem, or some other type of modem) that provides a backhaul link to a mobile operator's network. Thus, a low-power access point deployed in a user's home or business provides mobile network access to one or more devices via the broadband connection.

Various types of low-power access points may be employed in a given system. For example, low-power access points may be implemented as or referred to as femto cells, femto access points, small cells, femto nodes, home NodeBs (HNBs), home eNodeBs (HeNBs), access point base stations, pico cells, pico nodes, or micro cells.

For convenience, low-power access points may be referred to simply as small cells in the discussion that follows. Thus, it should be appreciated that any discussion related to small cells herein may be equally applicable to low-power access points in general (e.g., to femto cells, to micro cells, to pico cells, etc.).

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

Thus, in some aspects the teachings herein may be employed in a network that includes macro scale coverage (e.g., a large area cellular network such as a third generation (3G) network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a small cell. It should be appreciated that the teachings herein may be applicable to nodes associated with other types of coverage areas. For example, a pico access point may provide coverage (e.g., coverage within a commercial building) over an area that is smaller than a macro area and larger than a femto cell area. In various applications, other terminology may be used to reference a macro access point, a small cell, or other access point-type nodes. For example, a macro access point may be configured or referred to as an access node, base station, access point, eNodeB, macro cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 12:
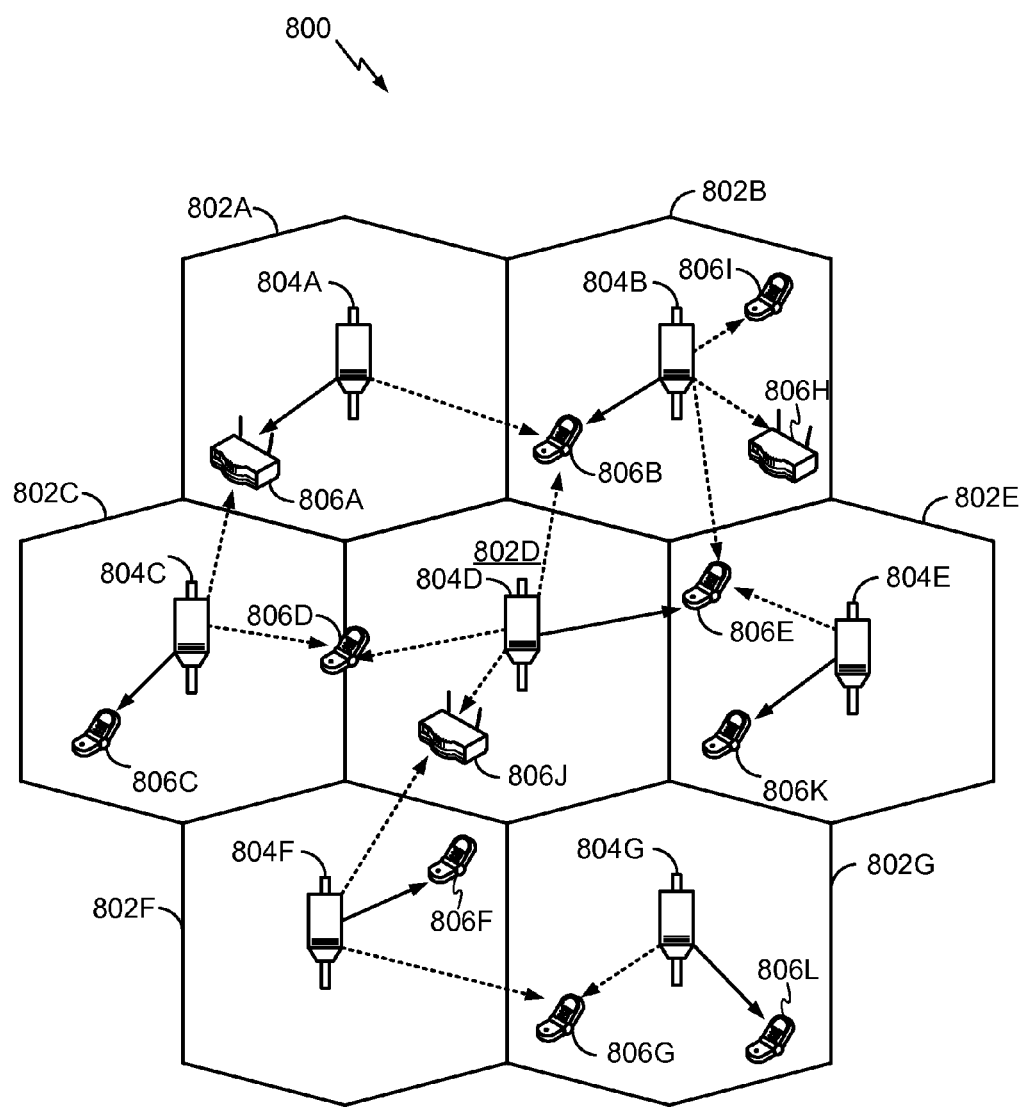
FIG. 12 is a diagram illustrating an example of a wireless communication system.

FIG. 12 illustrates a wireless communication system 800, configured to support a number of users, in which the teachings herein may be implemented. The system 800 provides communication for multiple cells 802, such as, for example, macro cells 802A-802G, with each cell being serviced by a corresponding access point 804 (e.g., access points 804A-804G), each of which may include load balancing component 320 (FIG. 4) configured to adjust a cell coverage of an access point (e.g., network entity 306) that only provides coverage in the licensed spectrum, so as to provide an access terminal (e.g., UE 302 in FIG. 4) with the capability of attaching to another access point (e.g., network entity 304 in FIG. 4) that provides coverage in both the licensed spectrum and the unlicensed spectrum. As shown in FIG. 12, access terminals 806 (e.g., access terminals 806A-806L) may be dispersed at various locations throughout the system over time. Each access terminal 806 may communicate with one or more access points 804 on a forward link (FL) and/or a reverse link (RL) at a given moment, depending upon whether the access terminal 806 is active and whether it is in soft handoff, for example. The wireless communication system 800 may provide service over a large geographic region. For example, macro cells 802A-802G may cover a few blocks in a neighborhood or several miles in a rural environment.

Figure 13:
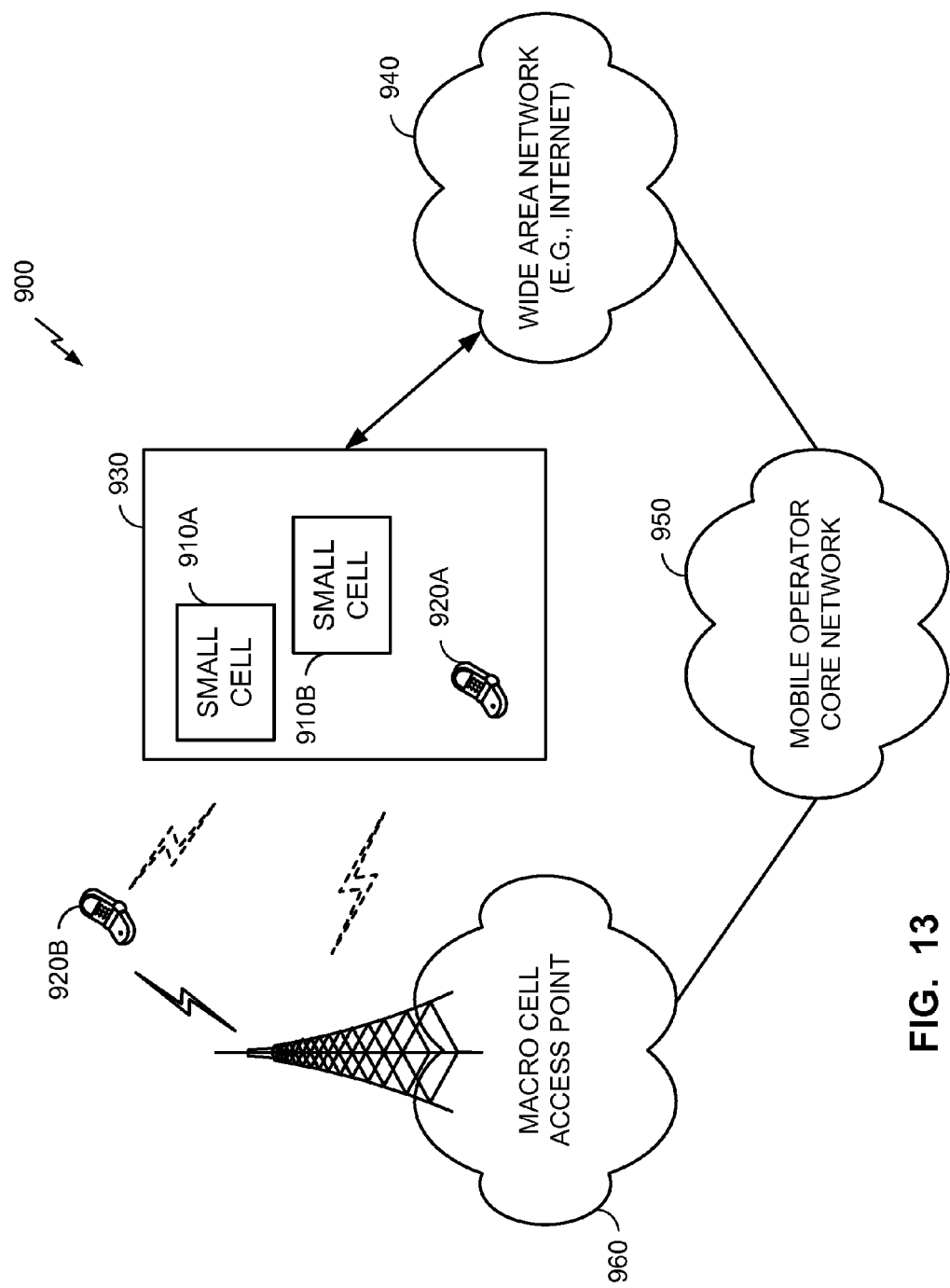
FIG. 13 is a diagram illustrating an example of a wireless communication system including small cells.

FIG. 13 illustrates an example of a communication system 900 where one or more small cells are deployed within a network environment. Specifically, the system 900 includes multiple small cells 910 (e.g., small cells 910A and 910B) installed in a relatively small scale network environment (e.g., in one or more user residences 930). Each small cell 910 may be coupled to a wide area network 940 (e.g., the Internet) and a mobile operator core network 950 via a DSL router, a cable modem, a wireless link, or other connectivity means (not shown). As will be discussed below, each small cell 910 may be configured to serve associated access terminals 920 (e.g., access terminal 920A) and, optionally, other (e.g., hybrid or alien) access terminals 920 (e.g., access terminal 920B). In other words, access to small cells 910 may be restricted whereby a given access terminal 920 may be served by a set of designated (e.g., home) small cell(s) 910 but may not be served by any non-designated small cells 910 (e.g., a neighbor's small cell 910).

Figure 14:
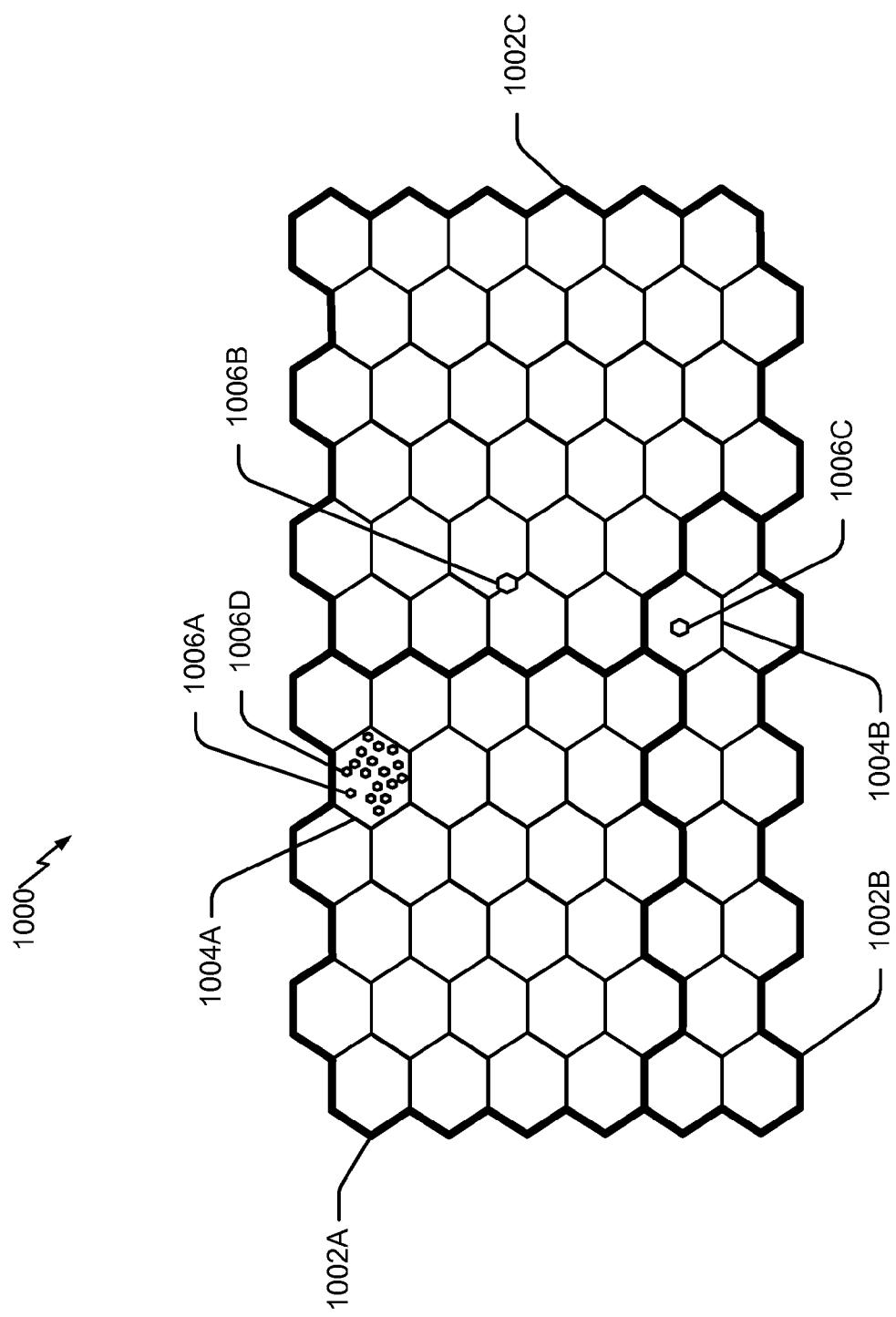
FIG. 14 is a diagram illustrating examples of coverage areas for wireless communication.

FIG. 14 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the larger hexagons. The tracking areas 1002 also include femto coverage areas 1006. In this example, each of the femto coverage areas 1006 (e.g., femto coverage areas 1006B and 1006C) is depicted within one or more macro coverage areas 1004 (e.g., macro coverage areas 1004A and 1004B). It should be appreciated, however, that some or all of a femto coverage area 1006 might not lie within a macro coverage area 1004. In practice, a large number of femto coverage areas 1006 (e.g., femto coverage areas 1006A and 1006D) may be defined within a given tracking area 1002 or macro coverage area 1004. Also, one or more pico coverage areas (not shown) may be defined within a given tracking area 1002 or macro coverage area 1004.

Referring again to FIG. 13, the owner of a small cell 910 may subscribe to mobile service, such as, for example, 3G mobile service, offered through the mobile operator core network 950. In addition, an access terminal 920 may be capable of operating both in macro environments and in smaller scale (e.g., residential) network environments. In other words, depending on the current location of the access terminal 920, the access terminal 920 may be served by a macro cell access point 960 associated with the mobile operator core network 950 or by any one of a set of small cells 910 (e.g., the small cells 910A and 910B that reside within a corresponding user residence 930). For example, when a subscriber is outside his home, he is served by a standard macro access point (e.g., access point 960), which may include load balancing component 320 (FIG. 4) configured to adjust a cell coverage of an access point (e.g., network entity 306) that only provides coverage in the licensed spectrum, so as to provide an access terminal (e.g., UE 302 in FIG. 4) with the capability of attaching to another access point (e.g., network entity 304 in FIG. 4) that provides coverage in both the licensed spectrum and the unlicensed spectrum, and when the subscriber is at home, he is served by a small cell (e.g., small cell 910A). Here, a small cell 910 may be backward compatible with legacy access terminals 920.

A small cell 910 may be deployed on a single frequency or, in the alternative, on multiple frequencies. Depending on the particular configuration, the single frequency or one or more of the multiple frequencies may overlap with one or more frequencies used by a macro access point (e.g., access point 960).

In some aspects, an access terminal 920 may be configured to connect to a preferred small cell (e.g., the home small cell of the access terminal 920) whenever such connectivity is possible. For example, whenever the access terminal 920A is within the user's residence 930, it may be desired that the access terminal 920A communicate only with the home small cell 910A or 910B.

In some aspects, if the access terminal 920 operates within the macro cellular network 950 but is not residing on its most preferred network (e.g., as defined in a preferred roaming list), the access terminal 920 may continue to search for the most preferred network (e.g., the preferred small cell 910) using a better system reselection (BSR) procedure, which may involve a periodic scanning of available systems to determine whether better systems are currently available and subsequently acquire such preferred systems. The access terminal 920 may limit the search for specific band and channel. For example, one or more femto channels may be defined whereby all small cells (or all restricted small cells) in a region operate on the femto channel(s). The search for the most preferred system may be repeated periodically. Upon discovery of a preferred small cell 910, the access terminal 920 selects the small cell 910 and registers on it for use when within its coverage area.

Access to a small cell may be restricted in some aspects. For example, a given small cell may only provide certain services to certain access terminals. In deployments with so-called restricted (or closed) access, a given access terminal may only be served by the macro cell mobile network and a defined set of small cells (e.g., the small cells 910 that reside within the corresponding user residence 930). In some implementations, an access point may be restricted to not provide, for at least one node (e.g., access terminal), at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., small cells) that share a common access control list of access terminals.

Various relationships may thus exist between a given small cell and a given access terminal. For example, from the perspective of an access terminal, an open small cell may refer to a small cell with unrestricted access (e.g., the small cell allows access to any access terminal). A restricted small cell may refer to a small cell that is restricted in some manner (e.g., restricted for access and/or registration). A home small cell may refer to a small cell on which the access terminal is authorized to access and operate on (e.g., permanent access is provided for a defined set of one or more access terminals). A hybrid (or guest) small cell may refer to a small cell on which different access terminals are provided different levels of service (e.g., some access terminals may be allowed partial and/or temporary access while other access terminals may be allowed full access). An alien small cell may refer to a small cell on which the access terminal is not authorized to access or operate on, except for perhaps emergency situations (e.g., emergency-911 calls).

From a restricted small cell perspective, a home access terminal may refer to an access terminal that is authorized to access the restricted small cell installed in the residence of that access terminal's owner (usually the home access terminal has permanent access to that small cell). A guest access terminal may refer to an access terminal with temporary access to the restricted small cell (e.g., limited based on deadline, time of use, bytes, connection count, or some other criterion or criteria). An alien access terminal may refer to an access terminal that does not have permission to access the restricted small cell, except for perhaps emergency situations, for example, such as 911 calls (e.g., an access terminal that does not have the credentials or permission to register with the restricted small cell).

For convenience, the disclosure herein describes various functionality in the context of a small cell. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 15:
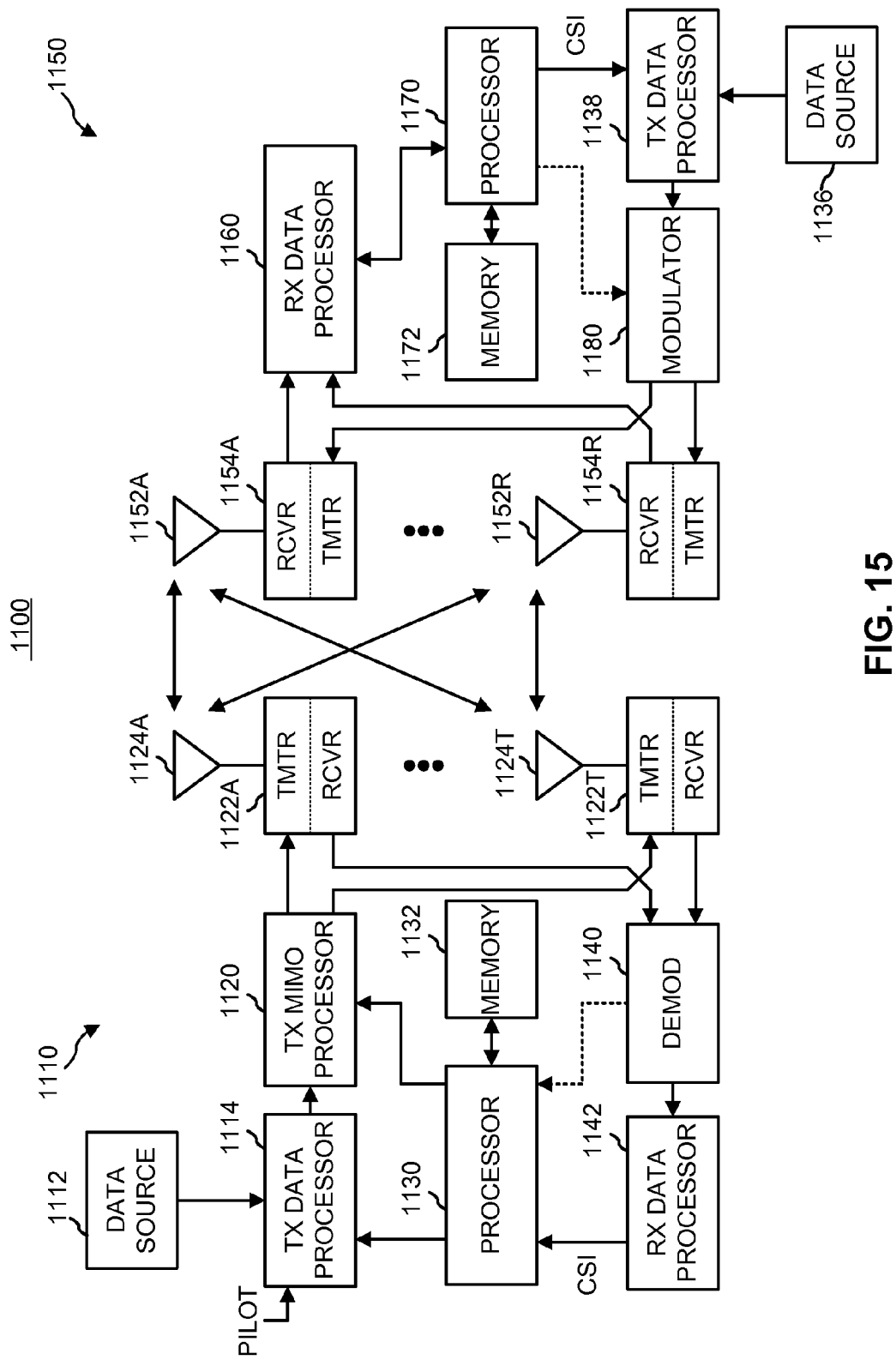
FIG. 15 is a block diagram illustrating an example of several aspects of communication components.

FIG. 15 illustrates in more detail the components of a wireless device 1110 (e.g., a small cell AP), which may include load balancing component 320 (FIG. 4) configured to adjust a cell coverage of an access point (e.g., network entity 306) that only provides coverage in the licensed spectrum, so as to provide an access terminal (e.g., UE 302 in FIG. 4) with the capability of attaching to another access point (e.g., network entity 304 in FIG. 4) that provides coverage in both the licensed spectrum and the unlicensed spectrum, and a wireless device 1150 (e.g., a UE) of a sample communication system 1100 that may be adapted as described herein. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides NT modulation symbol streams to NT transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1122A through 1122T are then transmitted from NT antennas 1124A through 1124T, respectively.

At the device 1150, the transmitted modulated signals are received by NR antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the NR received symbol streams from NR transceivers 1154 based on a particular receiver processing technique to provide NT "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

It will be appreciated that for each device 1110 and 1150 the functionality of two or more of the described components may be provided by a single component. It will be also be appreciated that the various communication components illustrated in FIG. 11 and described above may be further configured as appropriate to perform communication adaptation as taught herein. For example, the processors 1130/1170 may cooperate with the memories 1132/1172 and/or other components of the respective devices 1110/1150 to perform the communication adaptation as taught herein.

Figure 16:
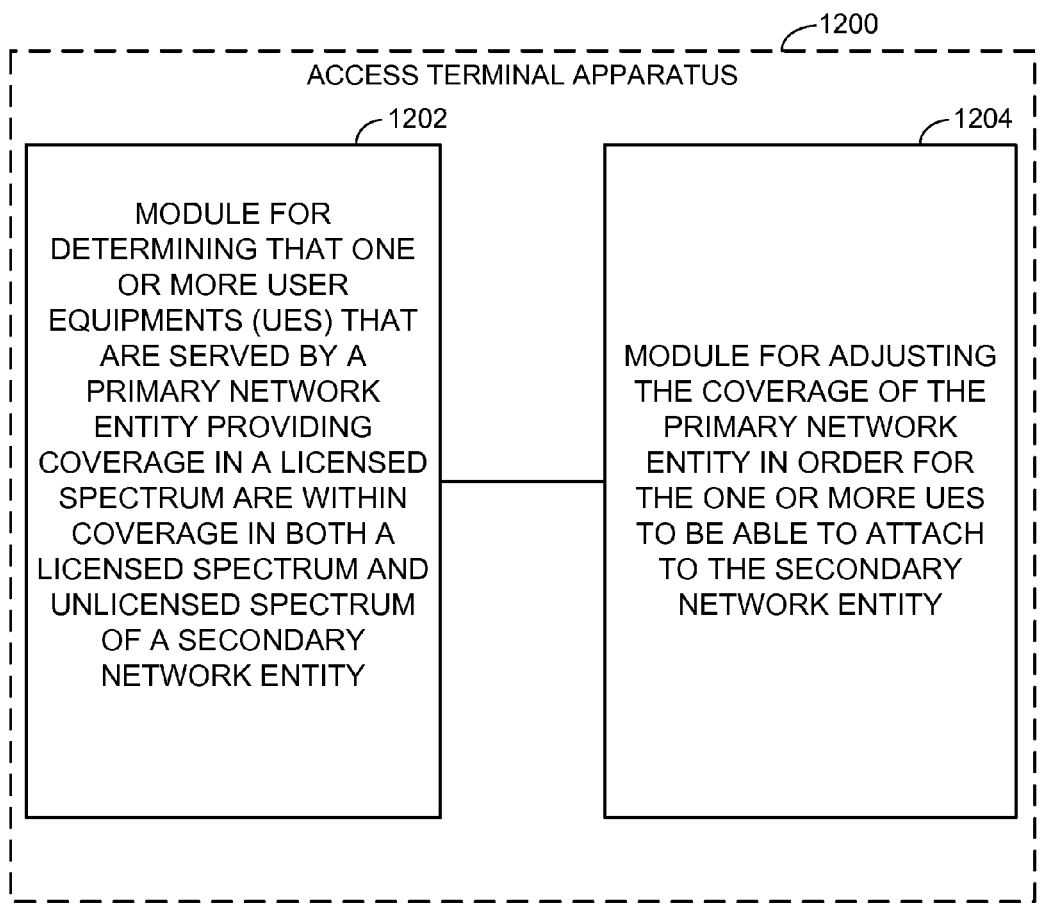
FIGS. 16 and 17 are block diagrams illustrating an example of several aspects of apparatuses configured to support communication as taught herein.

FIG. 16 illustrates an example access terminal apparatus 1200 represented as a series of interrelated functional modules. A module for determining that one or more user equipments (UEs) that are served by a primary network entity providing coverage in a licensed spectrum are within coverage in both a licensed spectrum and unlicensed spectrum of a secondary network entity 1202 may correspond at least in some aspects to, for example, a processing system as discussed herein. A module for adjusting the coverage of the primary network entity in order for the one or more UEs to be able to attach to the secondary network entity 1204 may correspond at least in some aspects to, for example, a processing system as discussed herein.

Figure 17:
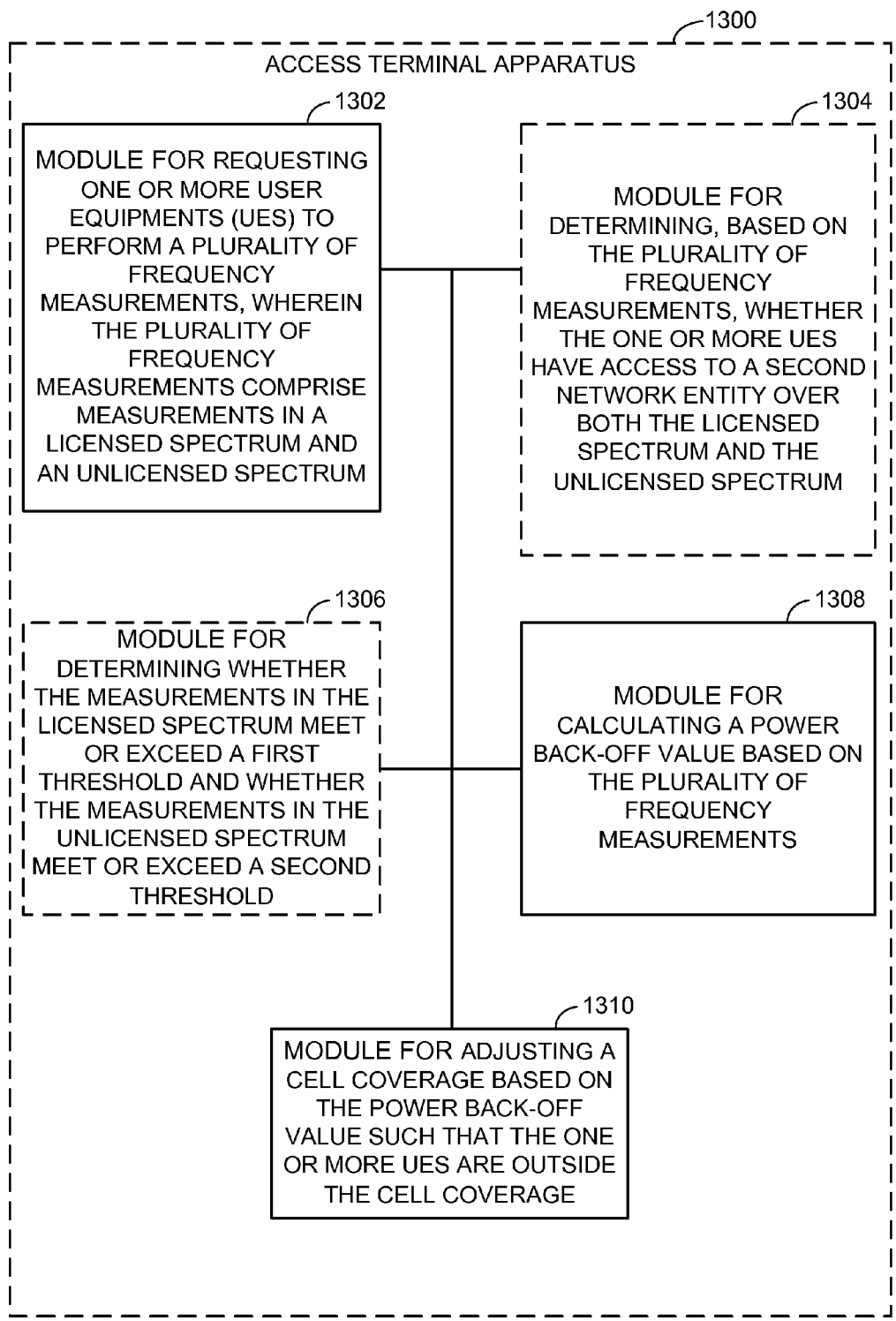

FIG. 17 illustrates an example access terminal apparatus 1300 represented as a series of interrelated functional modules. A module for requesting one or more user equipments (UEs) to perform a plurality of frequency measurements, wherein the plurality of frequency measurements comprise measurements in a licensed spectrum and an unlicensed spectrum 1302 may correspond at least in some aspects to, for example, a processing system as discussed herein. A module for determining, based on the plurality of frequency measurements, whether the one or more UEs have access to a second network entity over both the licensed spectrum and the unlicensed spectrum 1304 may correspond at least in some aspects to, for example, a processing system as discussed herein. A module for determining whether the measurements in the licensed spectrum meet or exceed a first threshold and whether the measurements in the unlicensed spectrum meet or exceed a second threshold 1306 may correspond at least in some aspects to, for example, a processing system as discussed herein. A module for calculating a power back-off value based on the plurality of frequency measurements 1308 may correspond at least in some aspects to, for example, a processing system as discussed herein. A module for adjusting a cell coverage based on the power back-off value such that the one or more UEs are outside the cell coverage 1310 may correspond at least in some aspects to, for example, a processing system as discussed herein.

The functionality of the modules of FIGS. 16-17 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module.

In addition, the components and functions represented by FIGS. 16-17 as well as other components and functions described herein, may be implemented using any suitable means. Such means also may be implemented, at least in part, using corresponding structure as taught herein. For example, the components described above in conjunction with the "module for" components of FIGS. 16-17 also may correspond to similarly designated "means for" functionality. Thus, in some aspects one or more of such means may be implemented using one or more of processor components, integrated circuits, or other suitable structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for requesting, by a first network entity, one or more user equipments (UEs) to perform a plurality of frequency measurements, wherein the plurality of frequency measurements comprise measurements in a licensed spectrum and measurements in an unlicensed spectrum; calculating, by the first network entity, a power back-off value based on the plurality of frequency measurements; and adjusting, by the first network entity, a cell coverage based on the power back-off value such that the one or more UEs are outside the cell coverage. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of wireless communication, comprising:
   requesting, by a first network entity, one or more user equipments (UEs) to perform a plurality of frequency measurements, wherein the plurality of frequency measurements comprises measurements in a licensed spectrum and measurements in an unlicensed spectrum;
   determining, based at least in part on the plurality of frequency measurements, whether the one or more UEs have access to a second network entity over both the licensed spectrum and the unlicensed spectrum;
   determining whether the measurements in the licensed spectrum meet or exceed a first threshold and whether the measurements in the unlicensed spectrum meet or exceed a second threshold, wherein the one or more UEs corresponding to the measurements in the licensed spectrum that meet or exceed the first threshold and the measurements in the unlicensed spectrum that meet or exceed the second threshold are designated to an offload set;
   calculating a power back-off value based at least in part on the plurality of frequency measurements and on whether the one or more UEs operate in both the licensed spectrum and the unlicensed spectrum, wherein calculating the power back-off value based on the plurality of frequency measurements comprises calculating the power back-off value based on frequency measurements performed by the one or more UEs designated to the offload set; and
   adjusting a cell coverage based on the power back-off value such that the one or more UEs are outside the cell coverage, wherein adjusting the cell coverage includes reducing the cell coverage when the one or more UEs have access to the second network entity over both the licensed spectrum and the unlicensed spectrum.

2. The method of claim 1, wherein adjusting the cell coverage based on the power back-off value such that the one or more UEs are outside the cell coverage comprises reducing the cell coverage such that the one or more UEs designated to the offload set are outside the cell coverage.

3. The method of claim 1, wherein adjusting the cell coverage based on the power back-off value such that the one or more UEs are outside the cell coverage causes the one or more UEs to attach to a second network entity providing cell coverage over both the licensed spectrum and the unlicensed spectrum.

4. The method of claim 1, wherein the requesting comprises requesting the one or more UEs to perform a plurality of frequency measurements on a second network entity.

5. The method of claim 1, wherein the measurements in the licensed spectrum comprise measurements of intra-frequency Reference Signal Received Power (RSRP) levels of a second network entity in the licensed spectrum.

6. The method of claim 1, wherein the measurements in the licensed spectrum comprise measurements of intra-frequency Reference Signal Received Quality (RSRQ) levels of a second network entity in the licensed spectrum.

7. The method of claim 1, wherein the measurements in the unlicensed spectrum comprise measurements of inter-frequency RSRP levels of a second network entity in the unlicensed spectrum.

8. The method of claim 1, wherein the measurements in the unlicensed spectrum comprise measurements of inter-frequency RSRQ levels of a second network entity in the unlicensed spectrum.

9. The method of claim 1, wherein the unlicensed spectrum comprises a radio frequency band used in contention-based network operations.

10. A non-transitory computer-readable medium storing computer executable code for wireless communication, comprising:
    code for requesting one or more user equipments (UEs) to perform a plurality of frequency measurements, wherein the plurality of frequency measurements comprises measurements in a licensed spectrum and an unlicensed spectrum;
    code for determining, based at least in part on the plurality of frequency measurements, whether the one or more UEs have access to a second network entity over both the licensed spectrum and the unlicensed spectrum;
    code for determining whether the measurements in the licensed spectrum meet or exceed a first threshold and whether the measurements in the unlicensed spectrum meet or exceed a second threshold, wherein the one or more UEs corresponding to the measurements in the licensed spectrum that meet or exceed the first threshold and the measurements in the unlicensed spectrum that meet or exceed the second threshold are designated to an offload set;
    code for calculating a power back-off value based at least in part on the plurality of frequency measurements and on whether the one or more UEs operate in both the licensed spectrum and the unlicensed spectrum, wherein the code for calculating the power back-off value based on the plurality of frequency measurements comprises calculating the power back-off value based on frequency measurements performed by the one or more UEs designated to the offload set; and
    code for adjusting a cell coverage based at least in part on the power back-off value such that the one or more UEs are outside the cell coverage, wherein adjusting the cell coverage includes reducing the cell coverage when the one or more UEs have access to the second network entity over both the licensed spectrum and the unlicensed spectrum.

11. An apparatus for wireless communication, comprising:
    means for requesting one or more user equipments (UEs) to perform a plurality of frequency measurements, wherein the plurality of frequency measurements comprises measurements in a licensed spectrum and an unlicensed spectrum;
    means for determining, based at least in part on the plurality of frequency measurements, whether the one or more UEs have access to a second network entity over both the licensed spectrum and the unlicensed spectrum;

means for determining whether the measurements in the licensed spectrum meet or exceed a first threshold and whether the measurements in the unlicensed spectrum meet or exceed a second threshold, wherein the one or more UEs corresponding to the measurements in the licensed spectrum that meet or exceed the first threshold and the measurements in the unlicensed spectrum that meet or exceed the second threshold are designated to an offload set;

means for calculating a power back-off value based at least in part on the plurality of frequency measurements and on whether the one or more UEs operate in both the licensed spectrum and the unlicensed spectrum, wherein the means for calculating the power back-off value based on the plurality of frequency measurements comprises calculating the power back-off value based on frequency measurements performed by the one or more UEs designated to the offload set; and means for adjusting a cell coverage based at least in part on the power back-off value such that the one or more UEs are outside the cell coverage, wherein adjusting the cell coverage includes reducing the cell coverage when the one or more UEs have access to the second network entity over both the licensed spectrum and the unlicensed spectrum.

12. An apparatus for wireless communication, comprising:

a memory storing executable instructions; and a processor in communication with the memory, wherein the processor is configured to execute instructions to:

request one or more user equipments (UEs) to perform a plurality of frequency measurements, wherein the plurality of frequency measurements comprises measurements in a licensed spectrum and an unlicensed spectrum;

determine, based at least in part on the plurality of frequency measurements, whether the one or more UEs have access to a second network entity over both the licensed spectrum and the unlicensed spectrum;

determine whether the measurements in the licensed spectrum meet or exceed a first threshold and whether the measurements in the unlicensed spectrum meet or exceed a second threshold, wherein the one or more UEs corresponding to the measurements in the licensed spectrum that meet or exceed the first threshold and the measurements in the unlicensed spectrum that meet or exceed the second threshold are designated to an offload set;

calculate a power back-off value based at least in part on the plurality of frequency measurements and on whether the one or more UEs operate in both the licensed spectrum and the unlicensed spectrum, wherein the processor configured to calculate the power back-off value based on the plurality of frequency measurements is further configured to calculate the power back-off value based on frequency measurements performed by the one or more UEs designated to the offload set; and adjust a cell coverage based at least in part on the power back off value such that the one or more UEs are outside the cell coverage, wherein the processor configured to adjust the cell coverage is further configured to reduce the cell coverage when the one or more UEs have access to the second network entity over both the licensed spectrum and the unlicensed spectrum.

13. The apparatus of claim 12, wherein adjusting the cell coverage based on the power back-off value such that the one or more UEs are outside the cell coverage comprises reducing the cell coverage such that the one or more UEs designated to the offload set are outside the cell coverage.

14. The apparatus of claim 12, wherein adjusting the cell coverage based on the power back-off value such that the one or more UEs are outside the cell coverage causes the one or more UEs to attach to a second network entity providing cell coverage over both the licensed spectrum and the unlicensed spectrum.

15. The apparatus of claim 12, wherein the requesting comprises requesting the one or more UEs to perform a plurality of frequency measurements on a second network entity.

16. The apparatus of claim 12, wherein the measurements in the licensed spectrum comprise measurements of intra-frequency Reference Signal Received Power (RSRP) levels of a second network entity in the licensed spectrum.

17. The apparatus of claim 12, wherein the measurements in the licensed spectrum comprise measurements of intra-frequency Reference Signal Received Quality (RSRQ) levels of a second network entity in the licensed spectrum.

18. The apparatus of claim 12, wherein the measurements in the unlicensed spectrum comprise measurements of inter-frequency RSRP levels of a second network entity in the unlicensed spectrum.

19. The apparatus of claim 12, wherein the measurements in the unlicensed spectrum comprise measurements of inter-frequency RSRQ levels of a second network entity in the unlicensed spectrum.

20. The apparatus of claim 12, wherein the unlicensed spectrum comprises a radio frequency band used in contention-based network operations.

* * * * *